United States Patent
Mosher

(10) Patent No.: US 12,338,619 B2
(45) Date of Patent: Jun. 24, 2025

(54) MASS TIMBER HANGER

(71) Applicant: Paul Matthews Mosher, Athens, GA (US)

(72) Inventor: Paul Matthews Mosher, Athens, GA (US)

( * ) Notice: Subject to any disclaimer, the term of this patent is extended or adjusted under 35 U.S.C. 154(b) by 332 days.

(21) Appl. No.: 17/807,118

(22) Filed: Jun. 15, 2022

(65) Prior Publication Data
US 2022/0412070 A1 Dec. 29, 2022

Related U.S. Application Data

(60) Provisional application No. 63/284,671, filed on Dec. 1, 2021, provisional application No. 63/215,512, filed on Jun. 27, 2021.

(51) Int. Cl.
*E04B 1/26* (2006.01)
*E04B 5/12* (2006.01)

(52) U.S. Cl.
CPC .......... *E04B 1/2612* (2013.01); *E04B 1/2608* (2013.01); *E04B 5/12* (2013.01)

(58) Field of Classification Search
CPC ......... E04B 1/2608; E04B 1/2612; E04B 5/12
USPC .......................................................... 52/702
See application file for complete search history.

(56) References Cited

U.S. PATENT DOCUMENTS

| | | | |
|---|---|---|---|
| 247,050 A | 9/1881 | Ham | |
| 784,218 A | 3/1905 | Lane | |
| 1,969,014 A * | 8/1934 | Karp | E04B 1/2608 403/384 |
| 2,098,485 A | 11/1937 | Carlson | |
| 2,911,690 A | 11/1959 | Sanford | |
| 3,596,941 A | 8/1971 | Tracy | |
| 4,525,972 A * | 7/1985 | Palacio | F16B 9/052 52/643 |
| 5,653,079 A * | 8/1997 | Loeffler | E04C 3/16 52/715 |
| 5,836,131 A | 10/1998 | Viola | |
| 6,209,277 B1 * | 4/2001 | DiGate | E04G 23/0203 52/715 |
| 6,230,467 B1 * | 5/2001 | Leek | F16B 9/052 52/715 |
| 6,295,780 B1 * | 10/2001 | Thompson | E04D 12/00 52/715 |
| 6,415,575 B1 * | 7/2002 | Thompson | E04B 1/2608 52/715 |
| 6,446,409 B1 * | 9/2002 | Emerson | E04F 15/04 52/715 |
| 6,698,971 B1 | 3/2004 | Wilhelmi | |
| 8,484,927 B2 * | 7/2013 | Nguyen | E04B 7/063 52/715 |
| 9,151,058 B1 | 10/2015 | Leathe | |
| 9,394,680 B2 | 7/2016 | Bundy | |
| 10,024,049 B2 | 7/2018 | Brekke | |

(Continued)

*Primary Examiner* — James J Buckle, Jr.

(57) ABSTRACT

A structural hanger providing a means for connecting a horizontal or sloped mass timber panel to a wall with sheathing without impairing the fire resistance rating of the wall. One embodiment comprises a plurality of legs, including a first leg with a means for connecting the hanger to a mass timber panel, a second leg with a means for connecting the hanger to structural members within the wall, and a third leg connecting the first and second leg to each other and extending through the sheathing mounted to the wall.

9 Claims, 30 Drawing Sheets

(56) References Cited

U.S. PATENT DOCUMENTS

| | | |
|---|---|---|
| 10,179,992 B2 | 1/2019 | Brekke |
| 10,184,242 B2 | 1/2019 | Brekke |
| 10,415,243 B2 * | 9/2019 | Schmidt ................ E04B 1/6112 |
| D912,496 S * | 3/2021 | Fox .............................. D25/128 |
| 11,021,867 B2 | 6/2021 | Brekke |
| 11,118,727 B2 * | 9/2021 | McKechnie ........... F16M 13/02 |
| 11,142,902 B2 | 10/2021 | Evans |
| 11,225,787 B2 | 1/2022 | Evans |
| 2015/0167291 A1 | 6/2015 | Bundy et al. |
| 2015/0184370 A1 | 7/2015 | Brekke et al. |
| 2017/0342701 A1 | 11/2017 | Brekke et al. |
| 2018/0038094 A1 | 2/2018 | Brekke |
| 2018/0355602 A1 | 12/2018 | Evans et al. |
| 2018/0363289 A1 | 12/2018 | Jensen et al. |
| 2019/0119901 A1 | 4/2019 | Brekke et al. |
| 2019/0284794 A1 | 9/2019 | Brekke et al. |
| 2019/0376275 A1 | 12/2019 | Evans et al. |
| 2021/0238841 A1 | 8/2021 | Brekke et al. |
| 2021/0396000 A1 | 12/2021 | Evans et al. |

* cited by examiner

MASS TIMBER HANGER

CROSS-REFERENCE TO RELATED APPLICATIONS

The present application claims the benefit of provisional patent application Ser. No. 63/215,512, titled "Mass Timber Panel Connector," filed Jun. 27, 2021 by the present inventor, which is incorporated by reference in its entirety. In addition, the present application claims the benefit of provisional patent application Ser. No. 63/284,671, titled "Mass Timber Hanger," filed Dec. 1, 2021 by the present inventor, which is incorporated by reference in its entirety.

FIELD OF THE INVENTION

The invention relates generally to building construction, and, more specifically, to devices used for the attachment of mass timber to other structures.

BACKGROUND

Model Building Codes in the United States require the use of fire resistance rated walls to manage various life safety risks applicable to building occupants. Building designers use fire resistance rated walls to safely separate areas of differing uses within buildings, to protect one building from another built in close proximity, and for other various reasons required by the local building inspectors based on the use of the building. Fire resistance rated walls manage the risk of the building occupants in a fire event by providing a lab tested assembly which has been shown to withstand fire for a predetermined amount of time, typically between 30 and 240 minutes, before structural failure and wall collapse occur. This predetermined and tested time limit before failure allows building design professionals to ensure building occupants can safely exit the building prior to its collapse from fire.

Model Building Codes describe several configurations of fire resistance rated walls in regards to their continuity, termination, and structural independence, even while the general makeup and materials used in the fire resistance rated walls remains the same. Continuity generally describes the allowable locations for the wall's top, bottom, and sides, and the means by which any opening or penetration of the wall must be designed. A wall's termination describes the means of ending a wall assembly. For instance, in some cases a wall's bottom termination must occur tight to the foundation and its top termination must occur tight to the roof sheathing. A wall's structural independence describes its ability to remain standing with or without the support of nearby elements.

The Model Building Code describes three types of fire resistance rated walls: Fire Walls, Fire Barriers, and Fire Partitions. The Code generally requires Fire Walls to be continuous from the foundation to the bottom of the roof and that they also be continuous from exterior wall or separate nearby Fire Wall to exterior wall or separate nearby Fire Wall. Fire Barriers are required to be continuous from the slab or sheathing of the floor assembly below, meaning the slab or floor assembly upon which the wall sits, to the bottom of the slab or sheathing of the floor above. Similarly, Fire Partitions are required to be continuous from the slab or sheathing of the floor assembly below to the bottom of the slab or sheathing of the floor above. However, unlike Fire Barriers, Fire Partitions may also terminate tight to the bottom of a horizontal fire resistance rated assembly above, such as a fire resistance rated floor assembly, whereas a Fire Barrier in the same location would be required to penetrate the fire resistance rated assembly above and terminate at the bottom of the slab or floor sheathing of that horizontal fire resistance rated assembly.

In typical fire resistance rated wall construction, one or more layers of some type of flat sheet material protect the wall's studs or masonry units from fire. These sheet materials, sometimes called sheathing, might be gypsum wallboard, glass matboard, or plywood.

The most common material used to increase the fire resistance rating of a wall is gypsum wallboard. A standard building material in the United States, gypsum wallboard generally consists of powdered gypsum, a naturally occurring mineral, which has been pressed into sheets and laminated front and back with paper. Gypsum's natural fire retardant characteristics slow the ignition of other parts of the wall assembly in the presence of extreme heat or open flame. While gypsum provides good protection in fire events to the structural members in a wall, it has very little bearing strength itself and cannot transfer robust structural loads, like floor or roof loads, without failing.

Sometimes the building industry refers to gypsum board as a wall's "protection layer" or simply as a wall's "protection." Common industry documents often refer to a wall assembly being "protected by" gypsum board. This protection, meaning the layers of gypsum wallboard, must be unbroken even through concealed spaces like above ceilings and inside of floor assemblies. In general, the continuity requirements imposed on both Fire Walls and Fire Barriers limits the capability of those types of walls to also carry the structural load of a floor above. That limitation results from a conflict between the Model Building Code's requirement that the entire wall assembly, including the exterior protection layer, terminate at the bottom of the slab or floor sheathing of the floor assembly above and the need for structure within the floor assembly, located below the floor sheathing, to bear upon the top of the wall. When this situation occurs (i.e. a Fire Wall or Fire Barrier must both pass through a floor assembly and support that same floor assembly), three basic options exist.

First, a separate wall may be built parallel to the fire resistance rated wall, below the floor assembly, to carry the load of the floor above. In addition to the increased time and cost of building an additional wall to support the load of the floor above, that secondary wall removes valuable interior floor space.

Second, the individual load bearing members within the floor system, meaning horizontal joists or trusses, may penetrate the gypsum wallboard and attach to the vertical load bearing members of the wall if the builder also seals all points of penetration through the protection with fire mastic. Besides the additional cost of fire mastic, this solution only works in some situations, as additional requirements for materials allowed in exterior load bearing walls prohibit non fire-resistance-treated wood in exterior walls in Type III construction. To make fire-resistance-treated wood, commonly called FRT in the industry, manufacturers inject a proprietary chemical mixture with pressure into wood during the milling process. Wood truss manufacturers have the ability to make wood trusses out of FRT so that they meet the requirements of allowable materials in exterior walls for Type III construction, but economically this practice does not make sense. Because only the last few inches of the truss which enter the exterior wall require the use of FRT wood, using FRT to build the entire truss wastes the more expensive resource.

The third solution for using fire resistance rated walls to carry the load of the floor above came relatively recently in the history of fire rated construction. A folded sheet metal joist hanger, designed to catch the end of a joist or truss, attaches to the top of a fire resistance rated wall and holds the end of the truss sufficiently far enough away from the wall that one or more layers of gypsum wallboard can pass between the end of the joist and the vertical studs (or other load bearing structure) within the wall. The design of these folded metal hangers allow the use of many types of linear horizontal structural members, meaning they can support and connect to solid sawn wood beams, wood truss-joist I-joists (TJI), and laminated veneer lumber (LVL) beams, to name a few. Folded metal hangers, sometimes called "fire hangers," are the preferred method of bearing floors on fire resistance rated walls. 10,024,049, Hanger for Fire Separation Wall, and U.S. Pat. No. 9,394,680, Drywall Joist Hanger, exhibit these characteristics and describe the general use of a fire hanger. Builders prefer this solution because it allows the construction of the fire resistance rated walls and floors within the same timeline as the rest of the building and without special skill or inspections. However, while the joist hanger solution offers builders an economical and speedy alternative to the use of fire mastic or to building an additional wall below floor to carry the floor's structural load, current joist hanger design limits their use to linear stick members such as solid sawn wood, truss joists, and engineered lumber. Existing fire hangers cannot be used to support structural loads from other types of structural members, like cross-laminated timber (CLT).

While it has been used for many years successfully in Europe, mass timber construction came relatively recently to the United States. Mass timber offers a more sustainable alternative to concrete and steel construction for a similar price in most circumstances. Much of the savings offered by mass timber comes from its speed of assembly. Mass timber panels are typically produced by laminating multiple layers of nominal wood lumber together in alternating directions with glue, nails, or dowels providing the means for adhesion. Fabricators then cut, pack, and ship mass timber panels to the building site. Once on site, the cranes swing the panels into place. Mass timber panels can be used as both walls and floors within a building. Because of wood's aesthetically pleasing appearance, building designers often leave mass timber panels exposed wherever possible. Mass timber panels also offer a certain intrinsic fire resistance based on the thickness of the panel and the specific char rate per hour of the wood species used.

As mass timber availability continues to grow, its usefulness also extends beyond showy buildings at global company headquarters and government buildings. Many designers and builders show interest in mixing traditional wood construction, commonly called "stick frame construction", with mass timber construction. While logistically advantageous, this type of hybrid construction is not currently possible because Model Building Codes require fire resistance rated or fire resistance treated exterior walls, which cannot be used together with mass timber floors with current technology.

SUMMARY

It would be advantageous to have, in accordance with one embodiment, a mass timber hanger comprising a plurality of legs, including a first leg with a means for attachment to a substantially horizontal structural panel member, a second leg with a means for attachment to structural members within a wall, and a third leg connecting the first leg and the second leg, said third leg holding the first leg and second apart at a predetermined distance, said distance being substantially equal to the thickness of a protective sheathing panel or panels, whereby the protective sheathing panel or panels interpose between the horizontal panel member and the structural members within the wall and the third leg extends through the protective sheathing.

ADVANTAGES

Accordingly, listed below are advantages of some of the aspects of the invention:
providing an off-the-shelf (e.g. not custom or designed for a specific building) solution for attaching a mass timber panel to a fire resistance rated wall;
that is simple to place in correct alignment without special tools or knowledge;
that are protected from fire from above and below after installation due to their relatively hidden perch;
that allow for the installation of protective sheathing panels before or after the installation of the hanger;
that provide an aesthetically pleasing connection by allowing maximum mass timber to remain exposed;
that provide a means of connecting mass timber panels to various structural wall materials;
that can attached in a similar manner no matter the thickness of structural member or mass timber panel or the thickness of wall;
that can be used to attach other flat or sheet materials besides mass timber to fire resistance rated wall;
that can be used in less than level panel installation, such as pitched roofs;
that can be used in less than level panel installation without the need to cut the leading edge of the panel for proper pitch;
that provides a means of bearing prior to final attachment to allow for fine adjustments before permanent attaching;
that provide an aesthetically pleasing connection due to its relatively hidden perch;
that can be used with various thicknesses of mass timber panels;
providing a building system for construction;
that provide a means for the use of mass timber floors and roofs in Type III construction in accordance with model building codes;
that provides a quick means of placement of mass timber panels on walls.

REFERENCE NUMERALS—FIGURES

In the drawings, highlighted features which exist along the same general portion of an embodiment have similar numbers in the hundred's position (e.g. features labeled 304 and 322 both exist along the vertical portion of the first leg.) The general breakdown of numerals is:
100—Individual Embodiments, Overall
200—First Leg, Horizontal Portion
300—First Leg, Vertical Portion
400—Second Leg, Horizontal Portion
500—Second Leg Vertical Portion
600—Third Leg
900—Generic or miscellaneous items outside the scope of the individual embodiments of the inventions
More specifically, the individual key notes are:
100 A First Embodiment, Overall 102 A Second Embodiment, Overall
104 A Third Embodiment, Overall
106 A Fourth Embodiment, Overall
108 A Fifth Embodiment, Overall
110 A Sixth Embodiment, Overall
112 A Seventh Embodiment, Overall
200 First Leg, Overall
202 First Leg, Vertical Portion
204 First Leg, Vertical Portion, Fastener Point
206 First Leg, Vertical Portion, First Connection Edge
208 First Leg, Vertical Portion, Second Connection Edge
224 First Leg, Vertical Portion, Front Face
226 First Leg, Vertical Portion, Back Face
228 First Leg, Vertical Portion, Bottom Edge
230 First Leg, Vertical Portion, Connecting Edge
232 First Leg, Vertical Portion, Gang Nail Hooks
302 First Leg, Horizontal Portion
304 First Leg, Horizontal Portion, Alignment Notch
306 First Leg, Horizontal Portion, Alignment Kerf
308 First Leg, Horizontal Portion, Connection Edge
310 First Leg, Horizontal Portion, Panel Seat
312 First Leg, Horizontal Portion, Panel Seat Connection Edge
314 First Leg, Horizontal Portion, Panel Seat Fastener Point
316 First Leg, Horizontal Portion, Top Face
318 First Leg, Horizontal Portion, Fixing Hook
400 Second Leg, Overall
402 Second Leg, Horizontal Portion
404 Second Leg, Horizontal Portion, Fastener Point
406 Second Leg, Horizontal Portion, Connection Edge
424 Second Leg, Horizontal Portion, Top Face
426 Second Leg, Horizontal Portion, Bottom Face
428 Second Leg, Horizontal Portion, Leading Edge
430 Second Leg, Horizontal Portion, Connecting Edge
432 Second Leg, Horizontal Portion, Alignment Point
434 Second Leg, Horizontal Portion, Fixing Hook
502 Second Leg, Vertical Portion
504 Second Leg, Vertical Portion, First Connection Edge
506 Second Leg, Vertical Portion, Second Connection Edge
508 Second Leg, Vertical Portion, Diagonal Face Cut
510 Second Leg, Vertical Portion, Bottom Edge
512 Second Leg, Vertical Portion, Pointing Bottom Corner
600 Third Leg, Overall
602 Third Leg, First Connection Edge
604 Third Leg, Second Connection Edge
606 Third Leg, Top Edge
608 Third Leg, Bottom Edge
610 Third Leg, Front Face
900 Generic Stud Wall, Overall
902 Generic Stud Wall, Double Top Plate
903 Generic Stud Wall, Double Top Plate Edge
904 Generic Stud Wall, Vertical Stud
905 Generic Stud Wall, Bottom Plate
906 Generic Stud Wall, Indicator Mark
908 Generic Fastener
930 Mass Timber Panel, Overall
935 Mass Timber Panel, Bottom Face
936 Mass Timber Panel, Top Face
937 Mass Timber Panel, Top Edge
938 Mass Timber Panel, Leading Face
939 Mass Timber Panel, Angled Leading Face
940 Mass Timber Panel, Indicator Mark
942 Gypsum Wallboard Panel Overall
944 Top Edge, Gypsum Wall Panel
946 Kerf, Gypsum Wall Panel
950 Gypsum Concrete Topping
952 Sound Isolation Mat
954 Batt Insulation
956 Weather Resistant Barrier
957 Roof Membrane
958 Exterior Siding
959 Rigid Insulation
960 Exterior Wall
962 Demising Wall
964 Roof
966 Foundation
968 Floor

BRIEF DESCRIPTION—FIGURES

Figure 3:
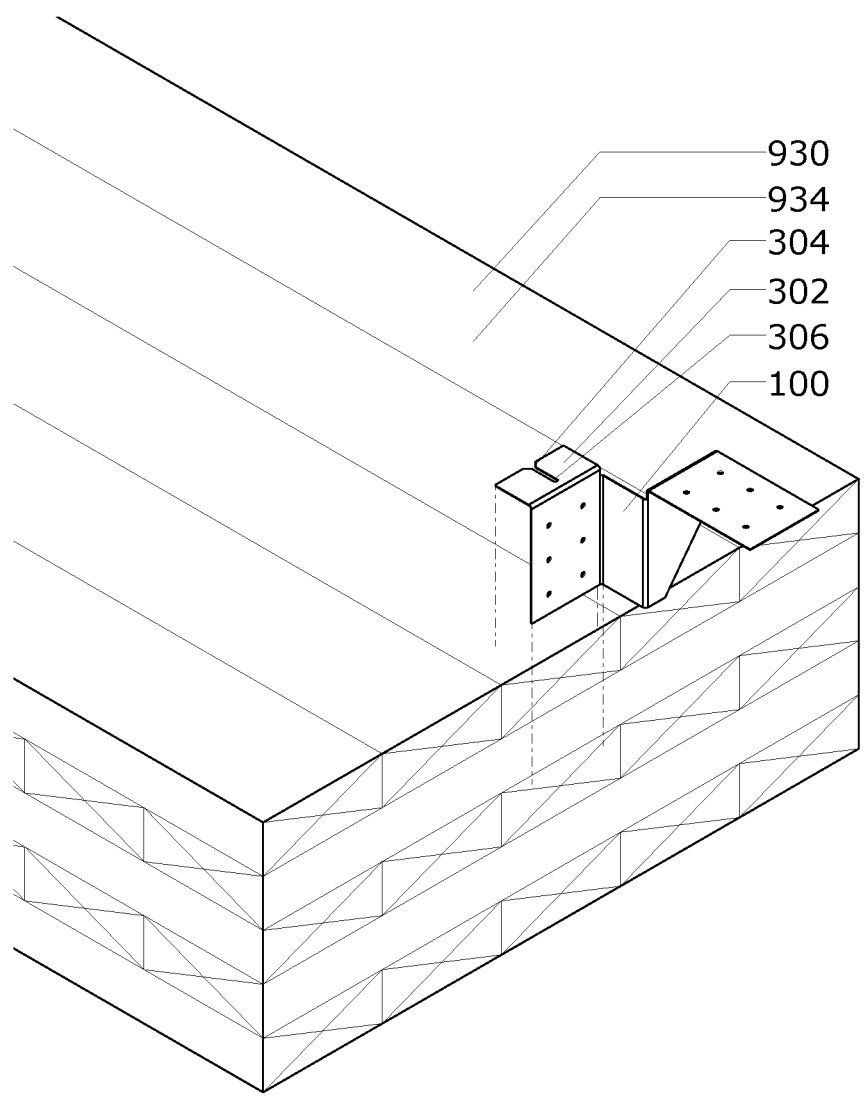
FIG. 3-8 show, in a series, one possible means of installation of the first embodiment of the device onto a mass timber panel and then onto a stud wall with gypsum wallboard sheathing.

More specifically, FIG. 3 shows the first embodiment being placed on a mass timber panel.

Figure 4:
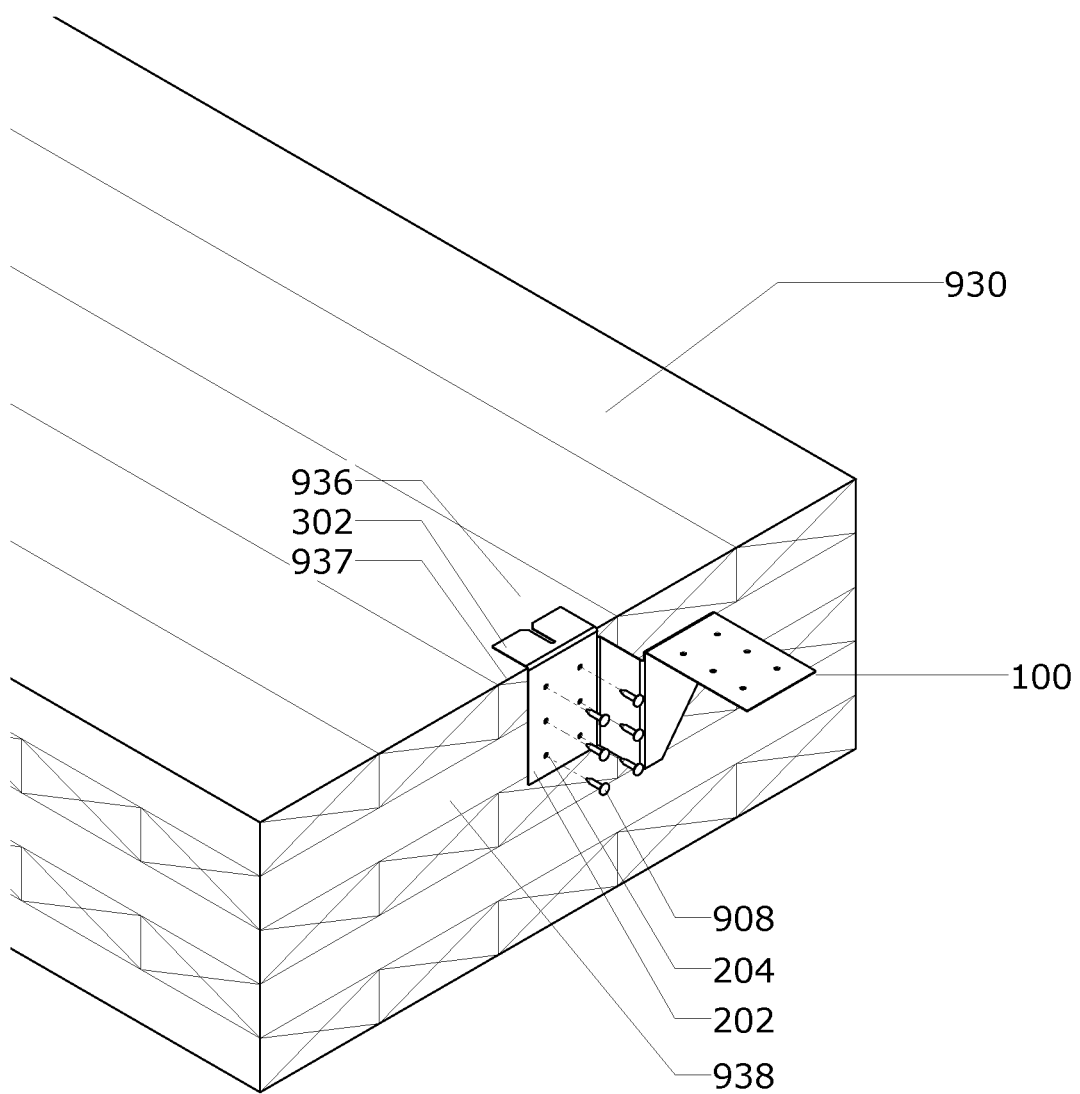

FIG. 4 shows the first embodiment fixed into place on the mass timber panel with fasteners.

Figure 5:
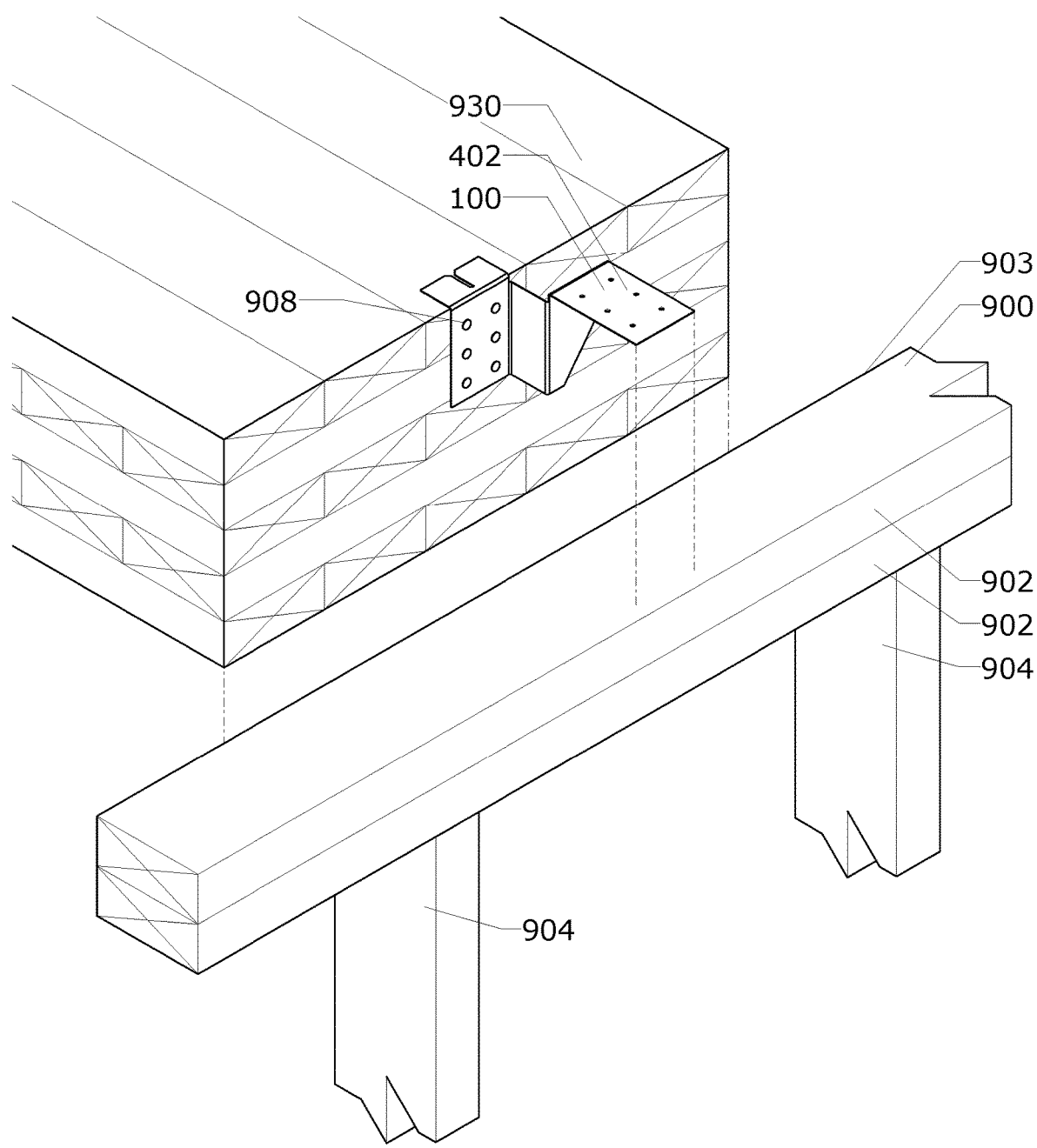

FIG. 5 shows the placement of the mass timber panel and first embodiment on the top of a stud wall.

Figure 6:
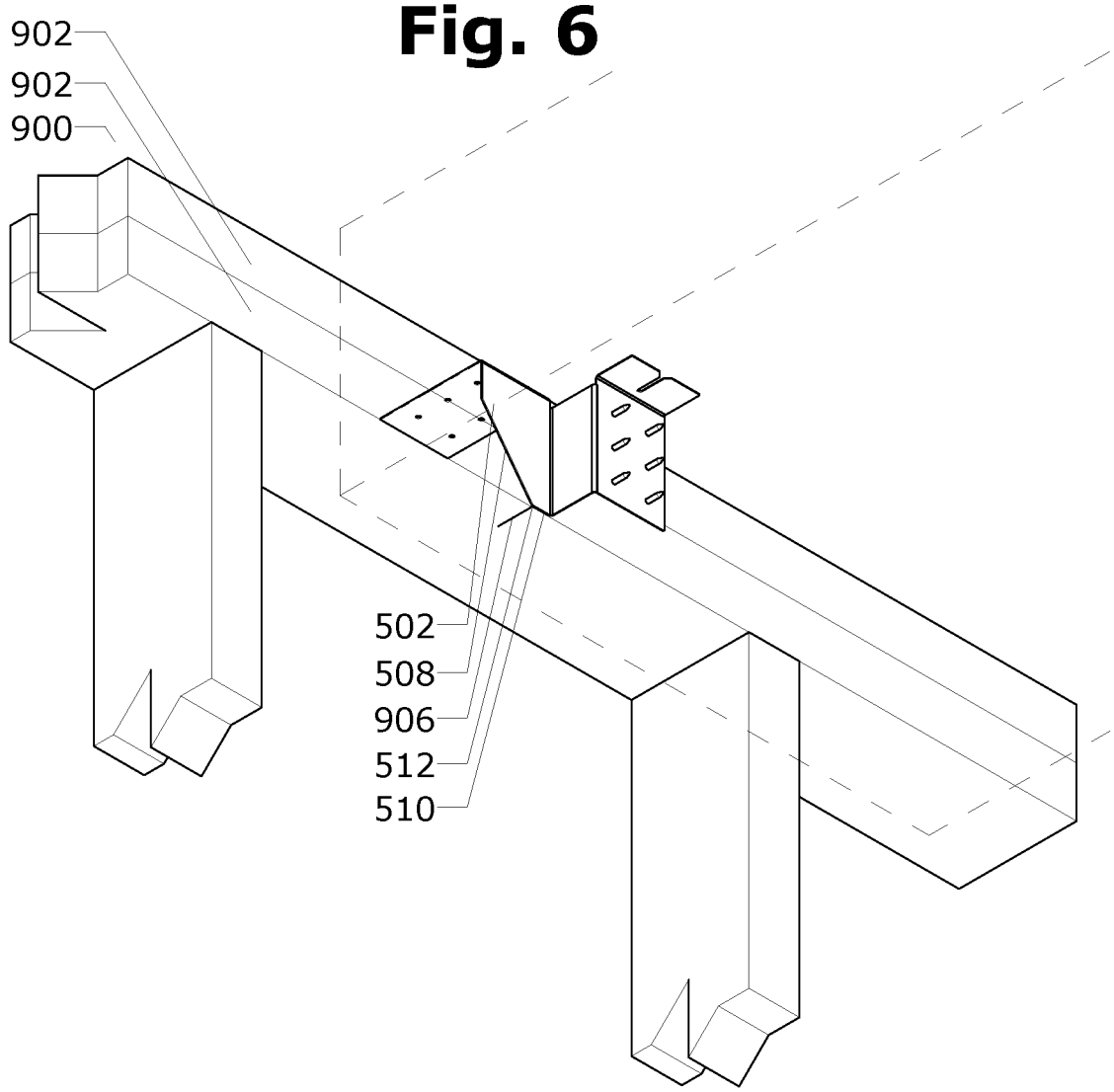

FIG. 6 shows a bottom back right axonometric view of the first embodiment on top of a stud wall, highlighting the alignment indices provided by the vertical portion of the second leg. The mass timber panel is shown dashed in this view to increase legibility.

Figure 7:
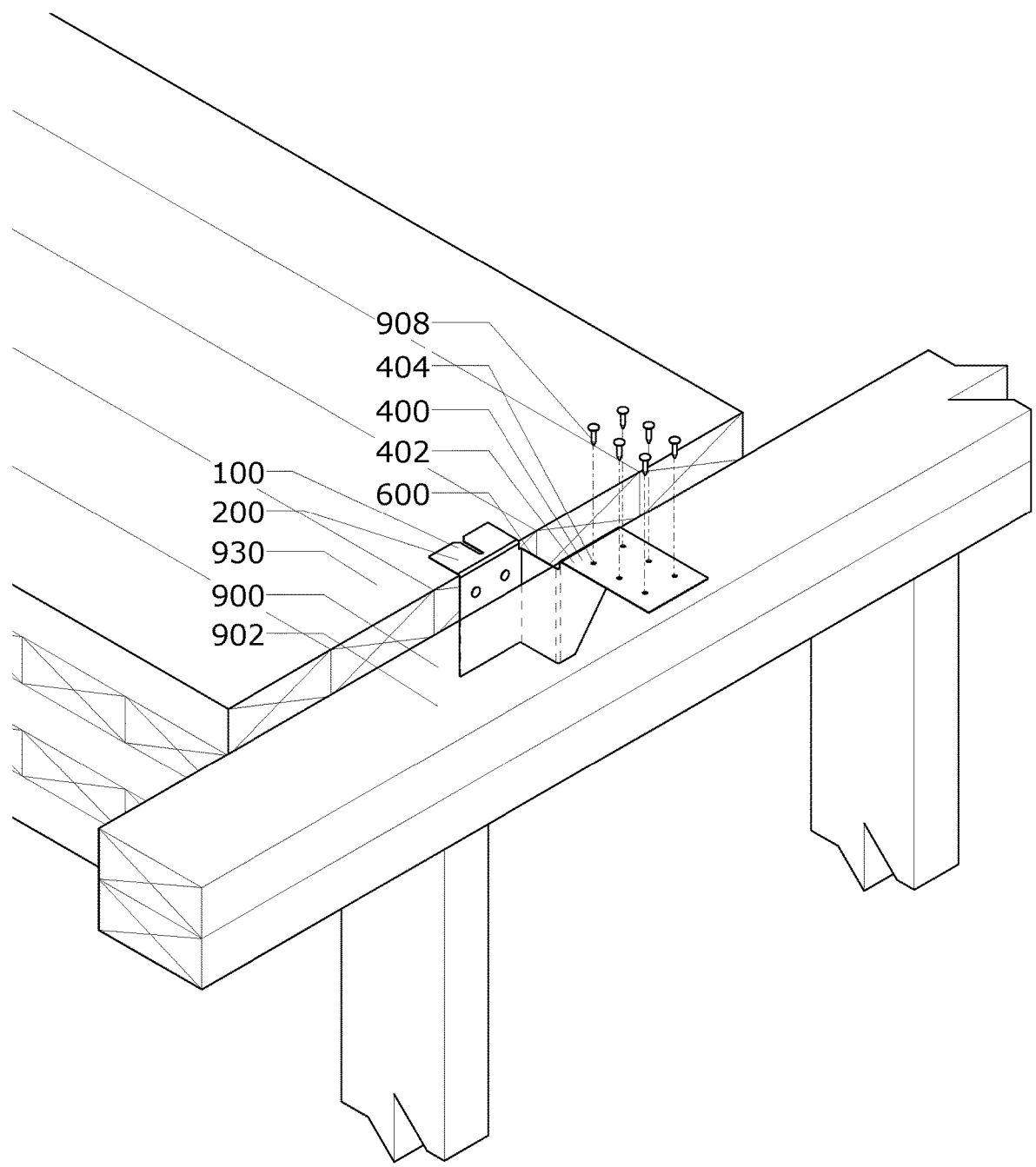

FIG. 7 shows the mass timber panel and first embodiment fixed into place on the stud wall.

Figure 8:
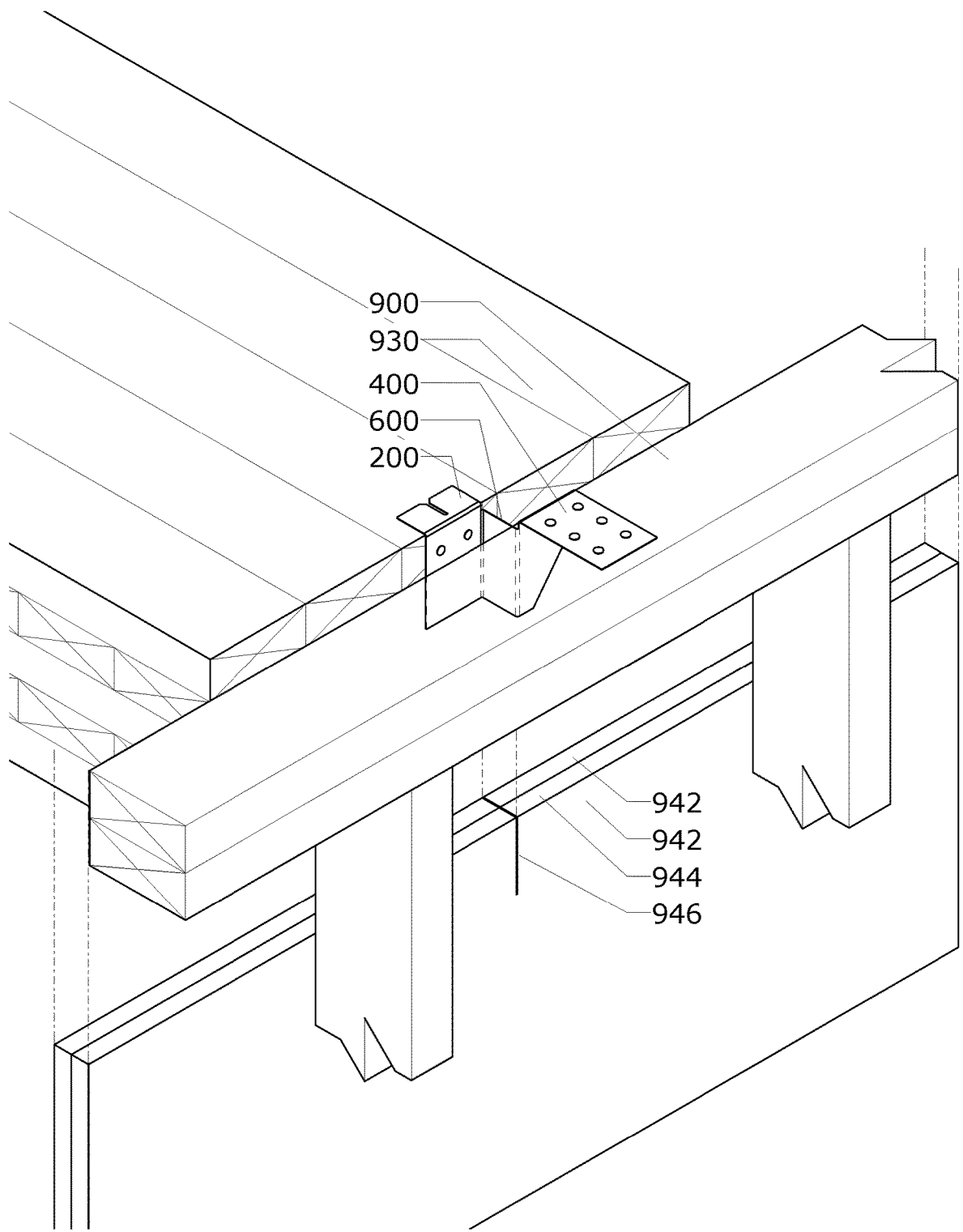

FIG. 8 shows two panels of gypsum wallboard sliding into the gap between the stud wall and the mass timber panel.

Figure 9:
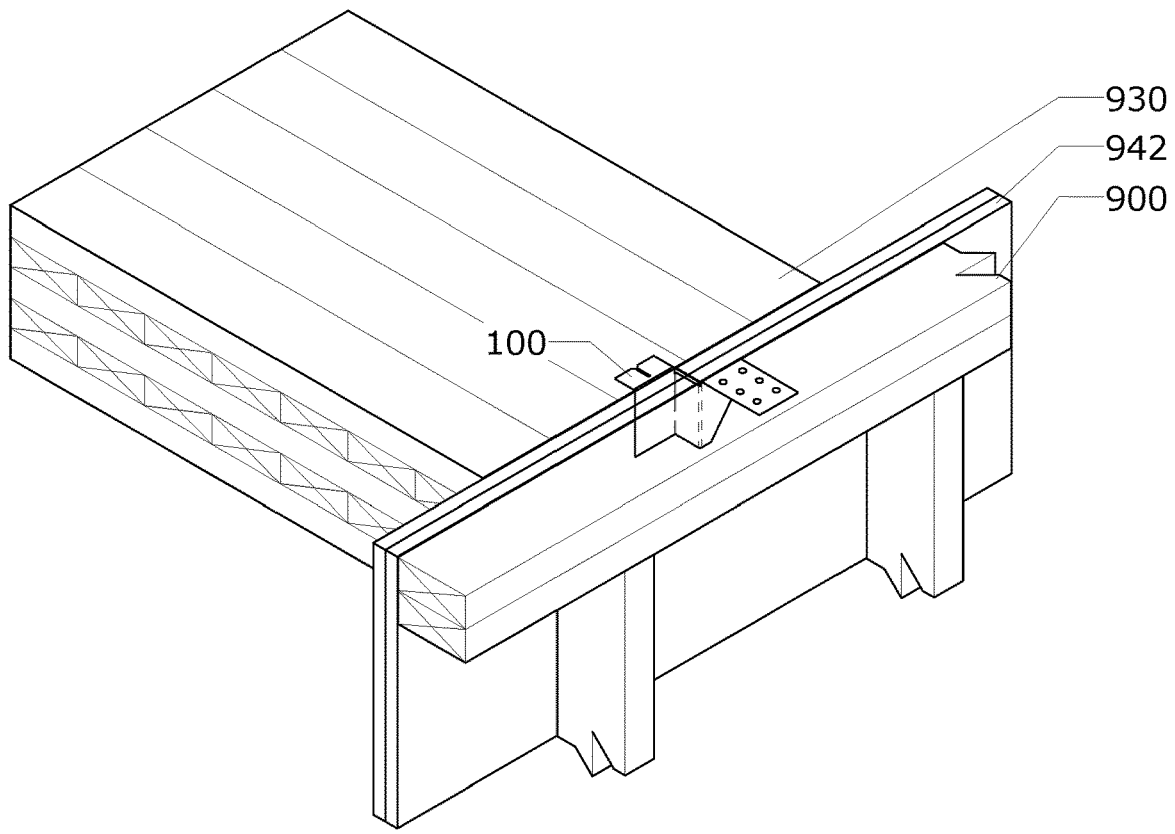

FIG. 9 shows a top front right isometric of the first embodiment connecting a mass timber panel to a stud wall with two layers of gypsum wallboard.

Figure 10:
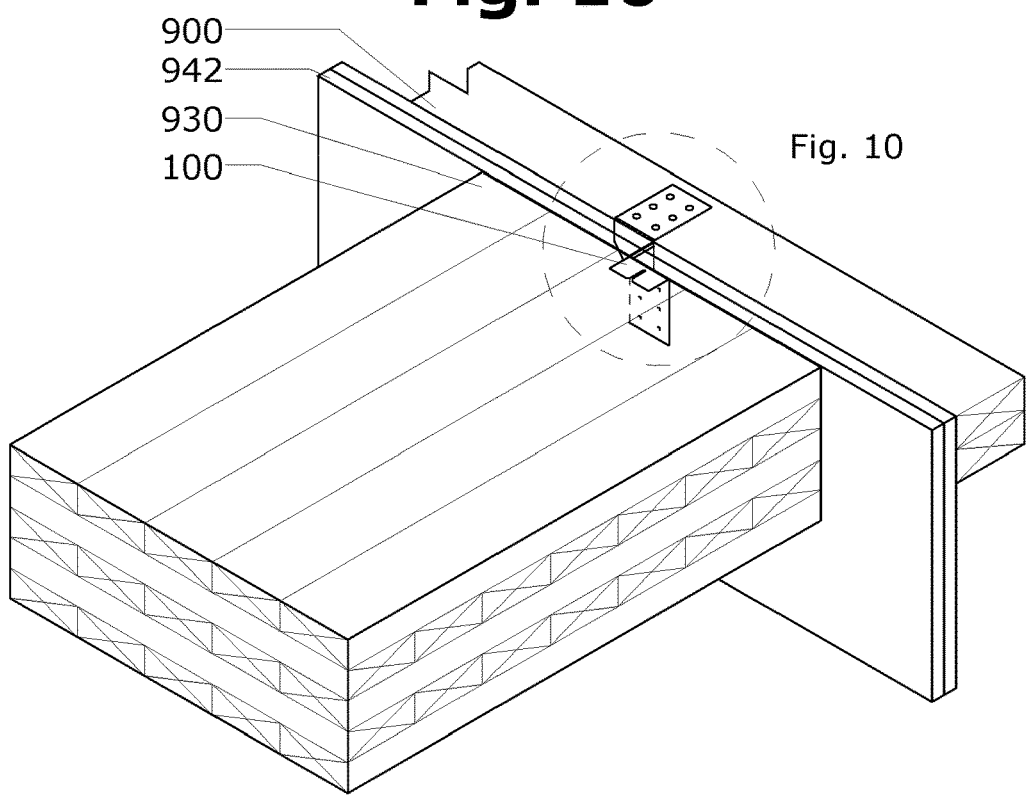

FIG. 10 shows the same subjects as FIG. 9, but in a back top left axonometric view.

Figure 11:
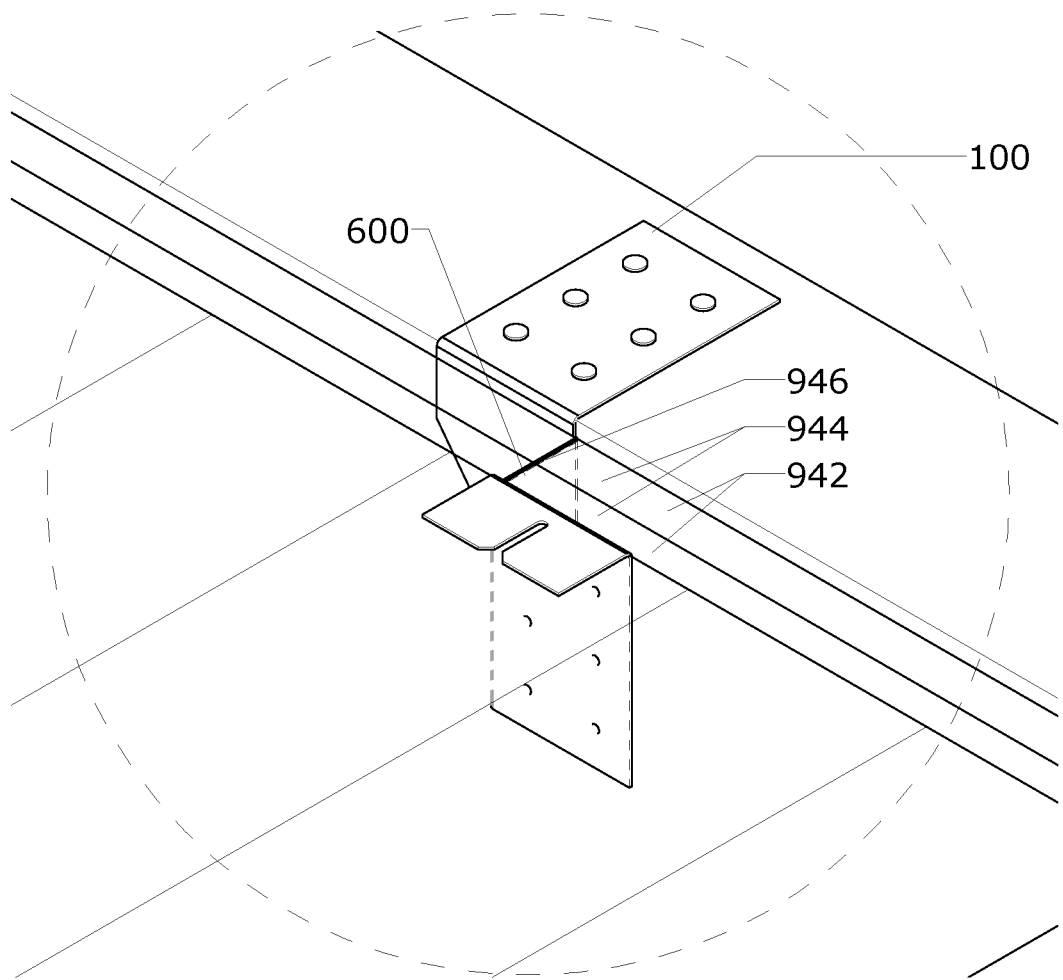

FIG. 11 shows an enlarged view of the connection shown in FIG. 10, with the gypsum wallboard pulled down slightly from the top of the wall for clarity.

Figure 12:
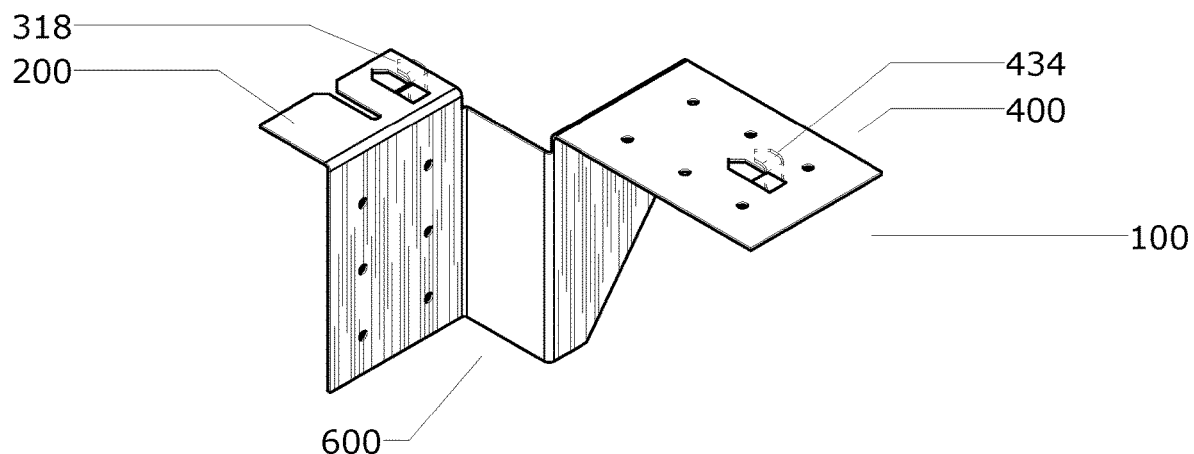

FIG. 12 shows additional fixing hooks on the mass timber hanger in a top front left axonometric view.

Figure 13:
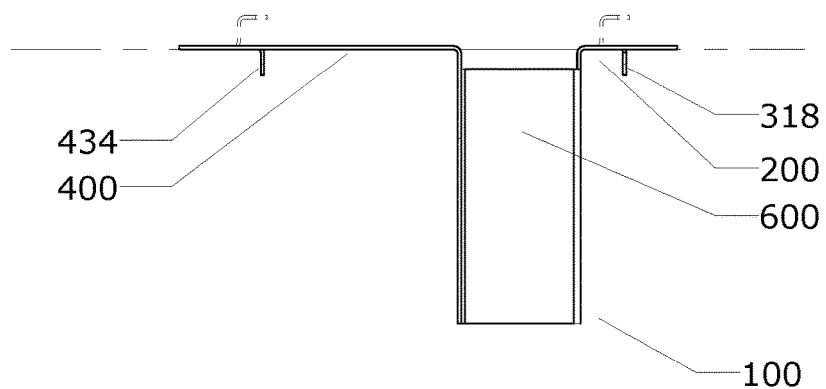

FIG. 13 shows additional fixing hooks on the mass timber hanger in a right elevation view.

Figure 14:
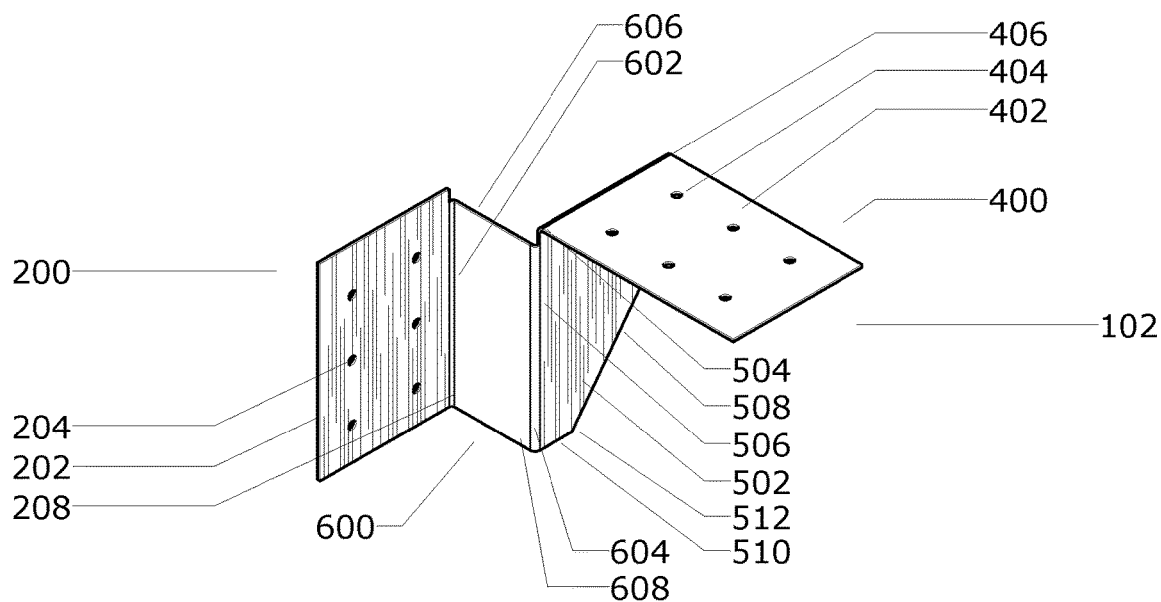

FIG. 14 shows a second embodiment of a mass timber hanger with a simplified first leg in a top front left axonometric view.

Figure 15:
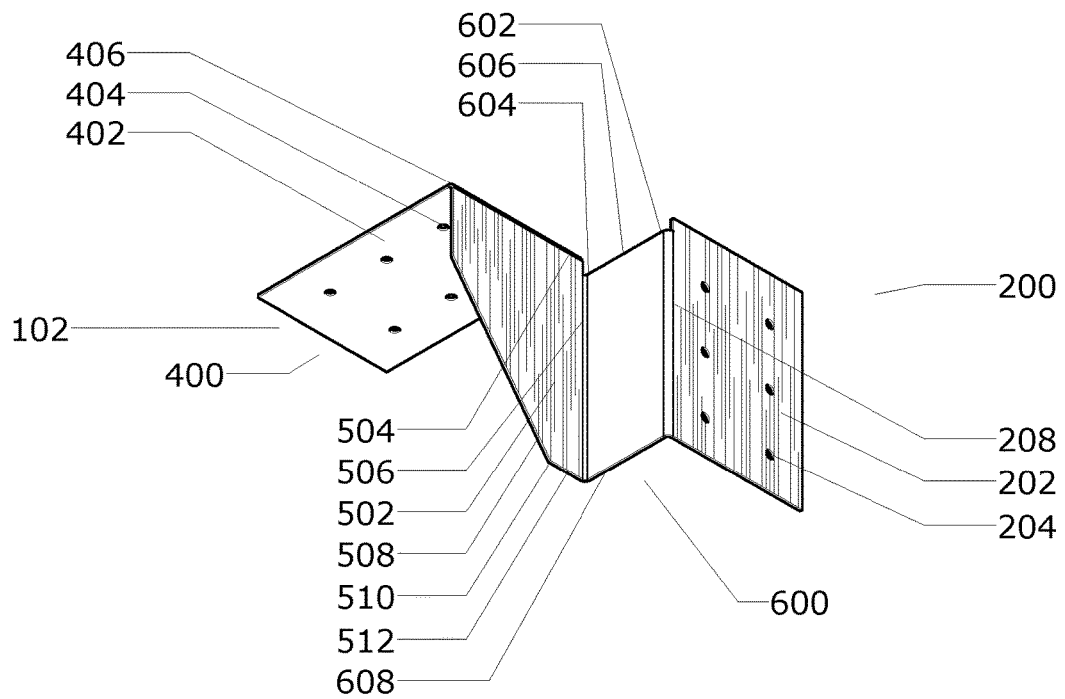

FIG. 15 shows the second embodiment of the mass timber hanger with the simplified first leg in a bottom back right axonometric view.

Figure 16:
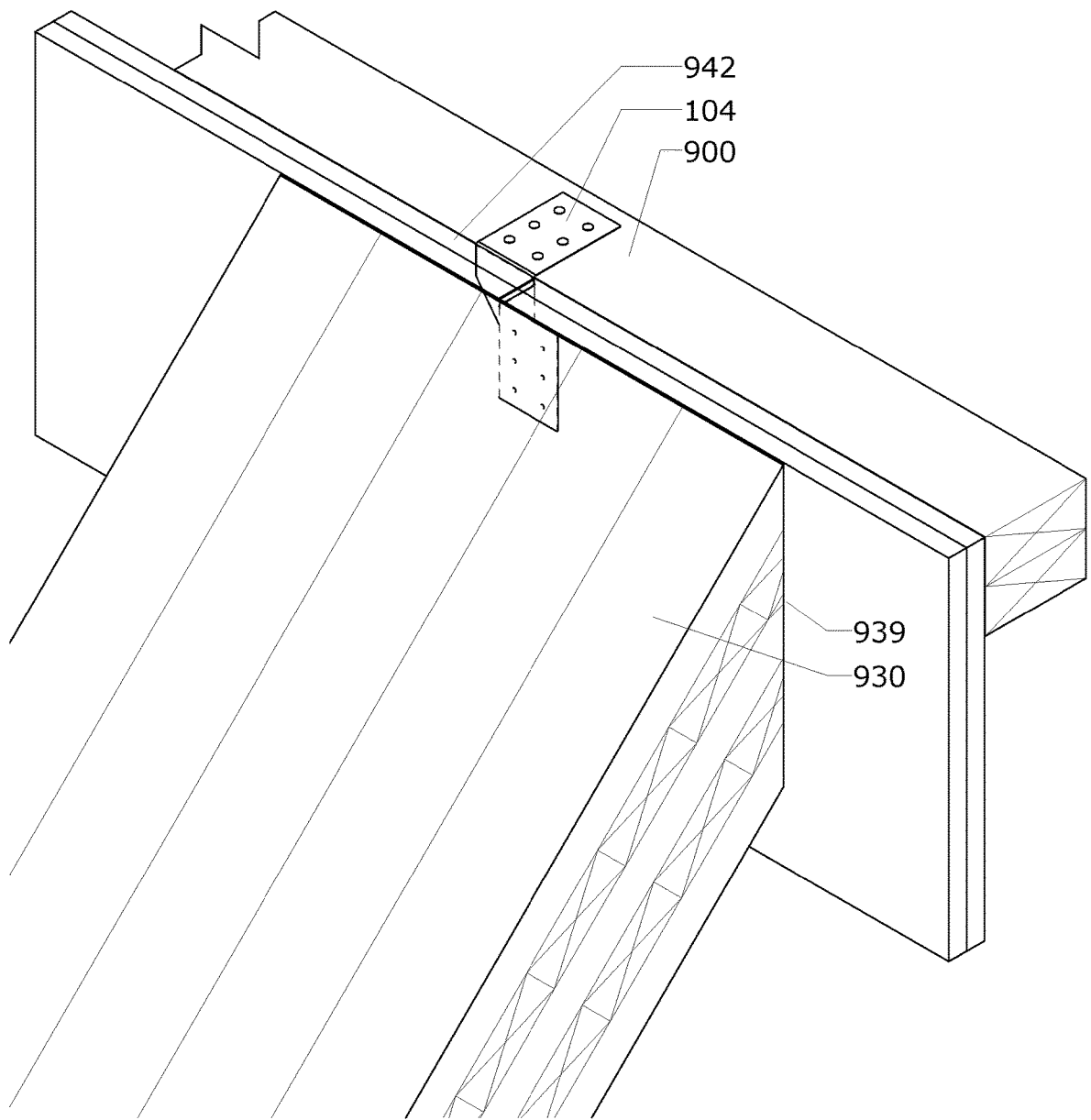

FIG. 16 shows a mass timber panel with an angled leading edge attached to the second embodiment of the mass timber hanger attached to a stud wall with gypsum wallboard panels interposed between the mass timber panel and stud wall, in a top back left axonometric view.

Figure 17:
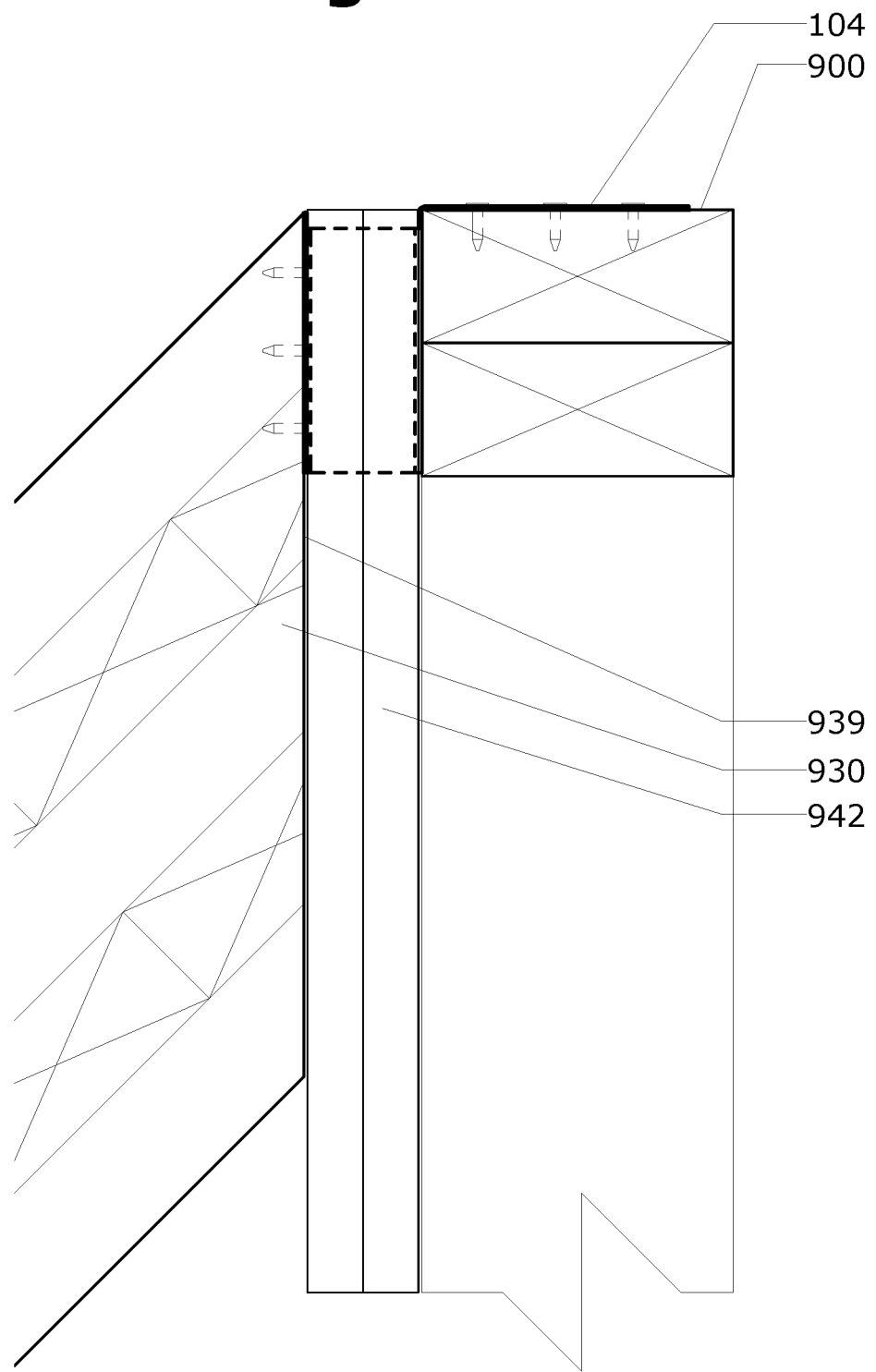

FIG. 17 shows the same content as FIG. 16 in a right elevation.

Figure 18:
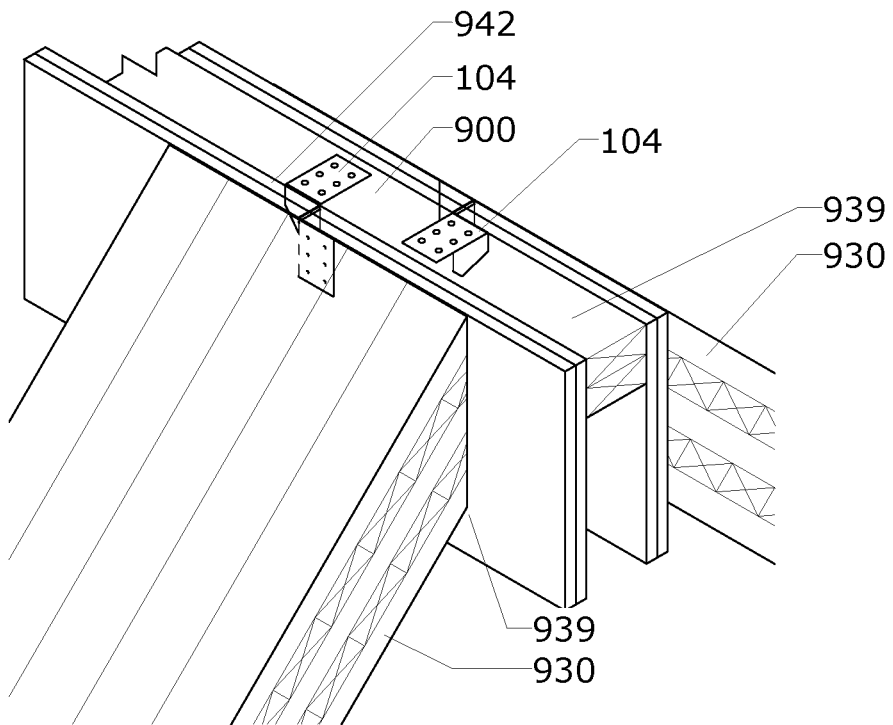

FIG. 18 shows two mass timber panels, both with angled leading edges, attached to two mass timber hangers attached to the stud wall with gypsum wallboard panels interposed between the mass timber panel and stud wall, in a top back left axonometric view.

Figure 19:
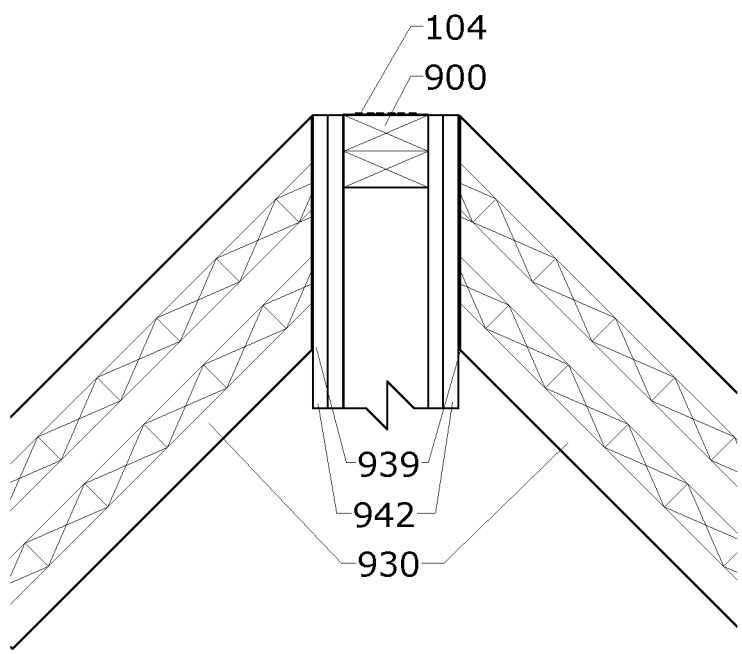

FIG. 19 shows the same content as FIG. 18 in a right elevation.

Figure 20:
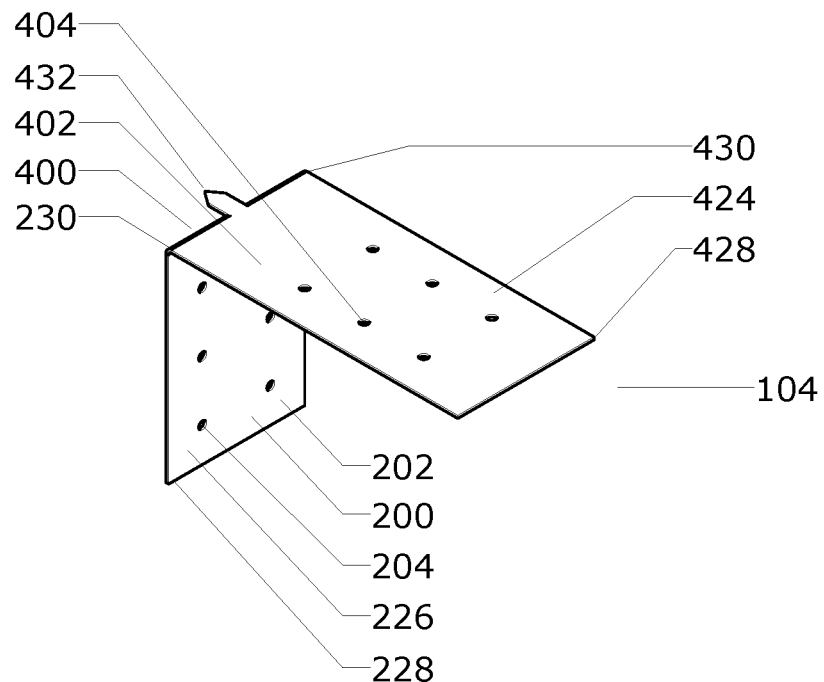

FIG. 20 shows a third embodiment of a mass timber hanger with a simplified first leg in a top front left axonometric view.

Figure 21:
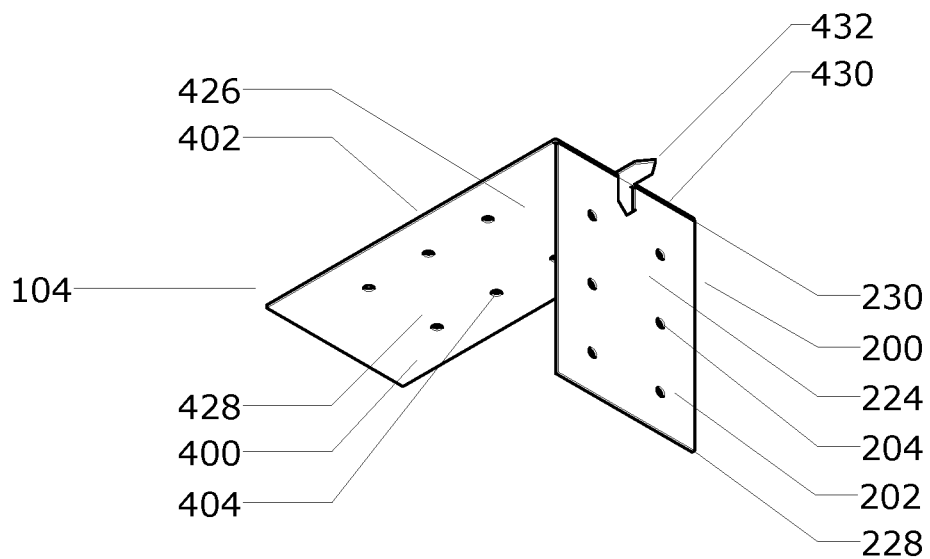

FIG. 21 shows the third embodiment of the mass timber hanger with a simplified first leg in a bottom back right axonometric view.

Figure 22:
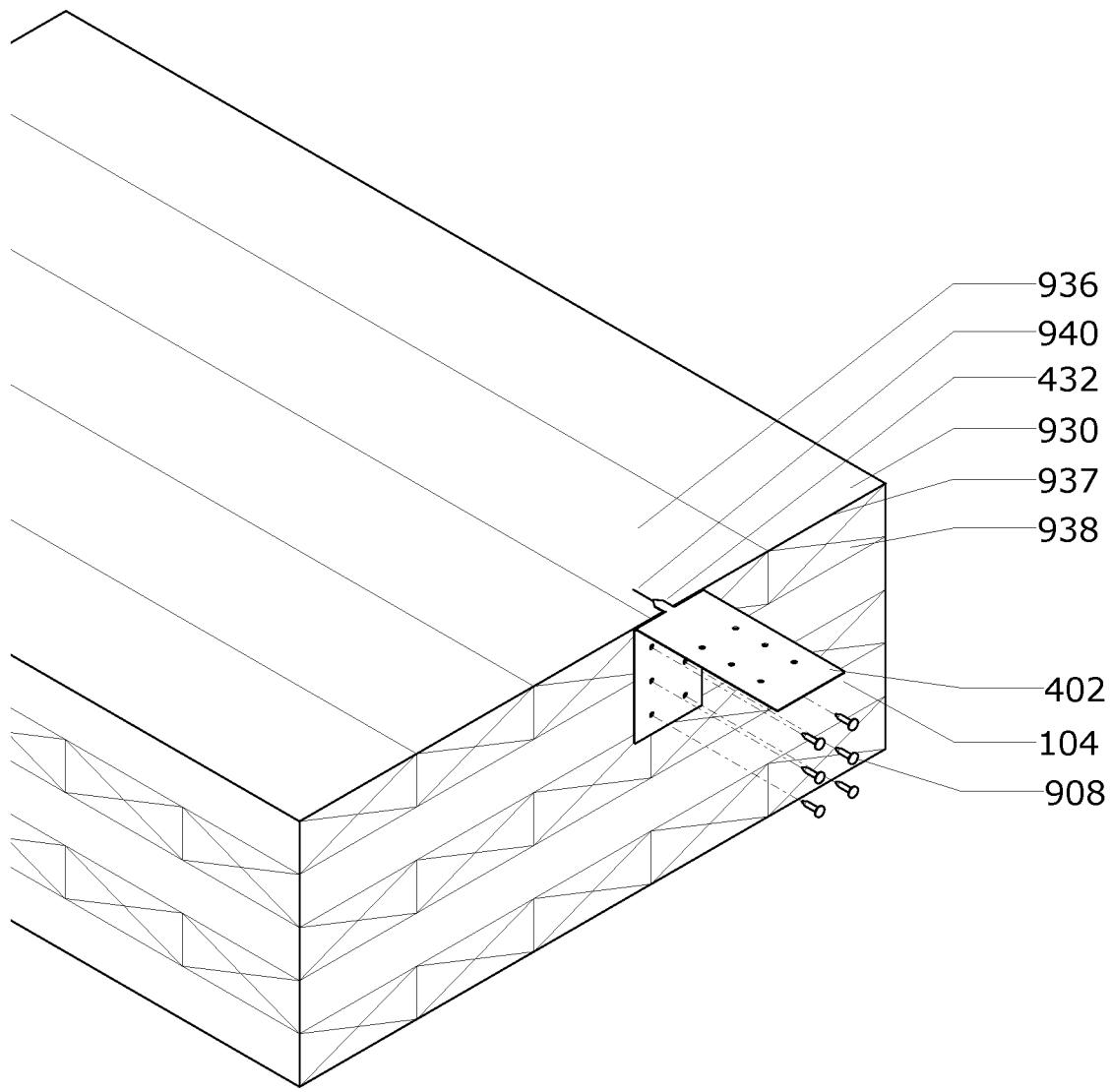

FIG. 22 shows the third embodiment of the mass timber hanger registered to the top edge of the mass timber panel.

Figure 23:
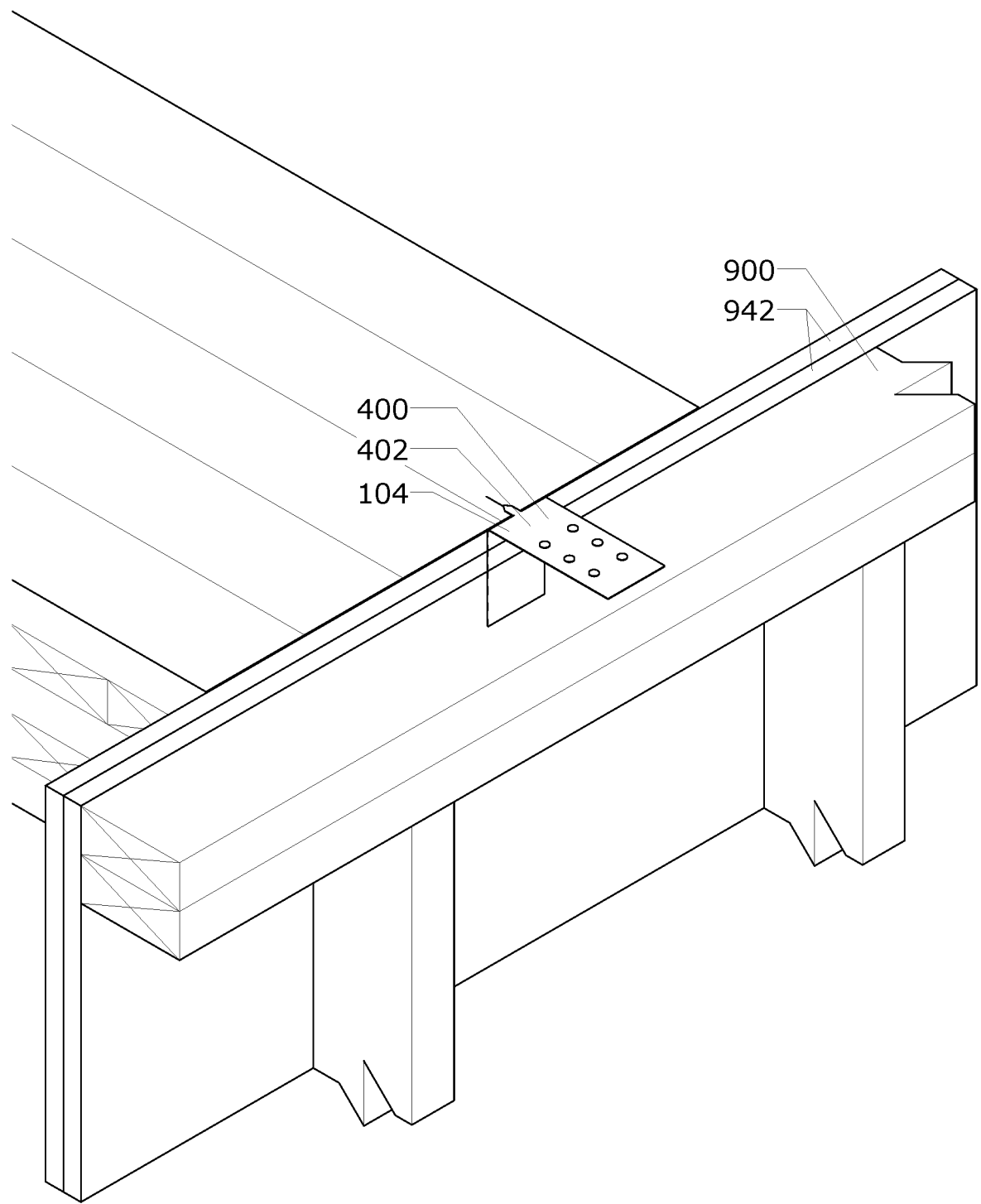

FIG. 23 shows the third embodiment of the mass timber hanger attached to the top of a wall and attached to the mass timber panel with two panels of protective sheathing interposed between the wall and the mass timber panel.

Figure 24:
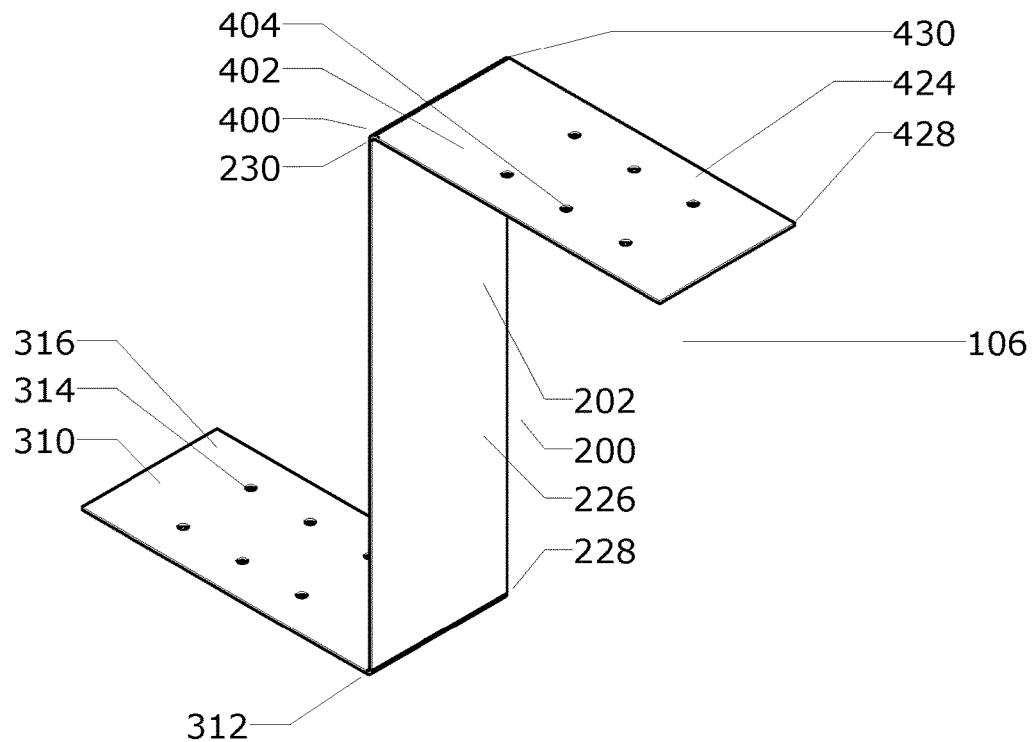

FIG. 24 shows a fourth embodiment of a device in a top front left axonometric view.

Figure 25:
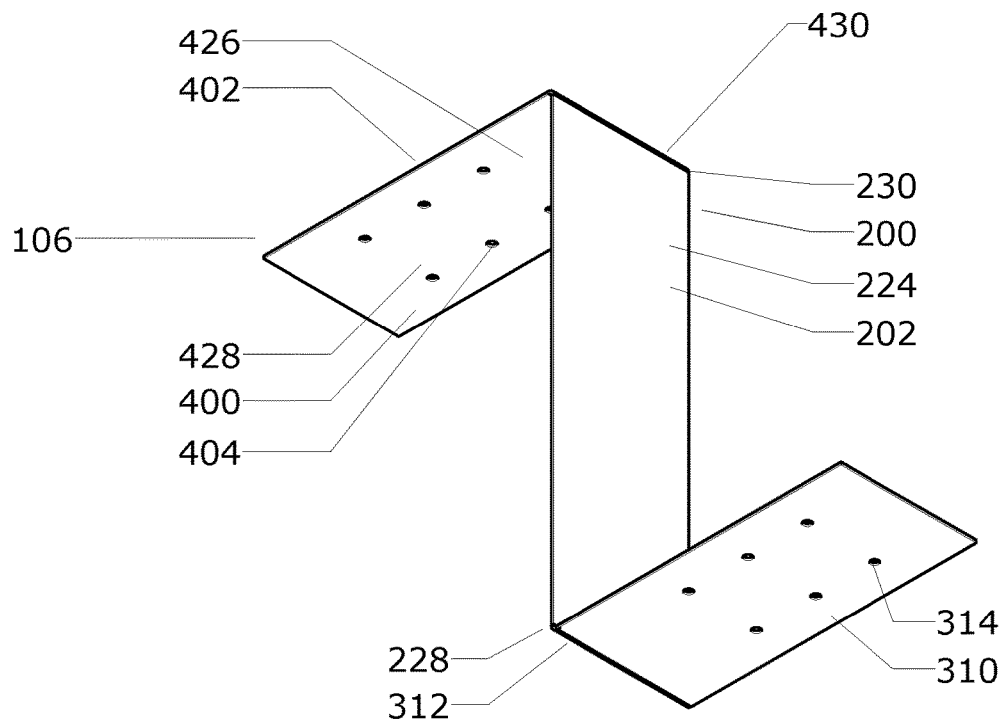

FIG. 25 shows the fourth embodiment of the device in a bottom back right axonometric view.

Figure 26:
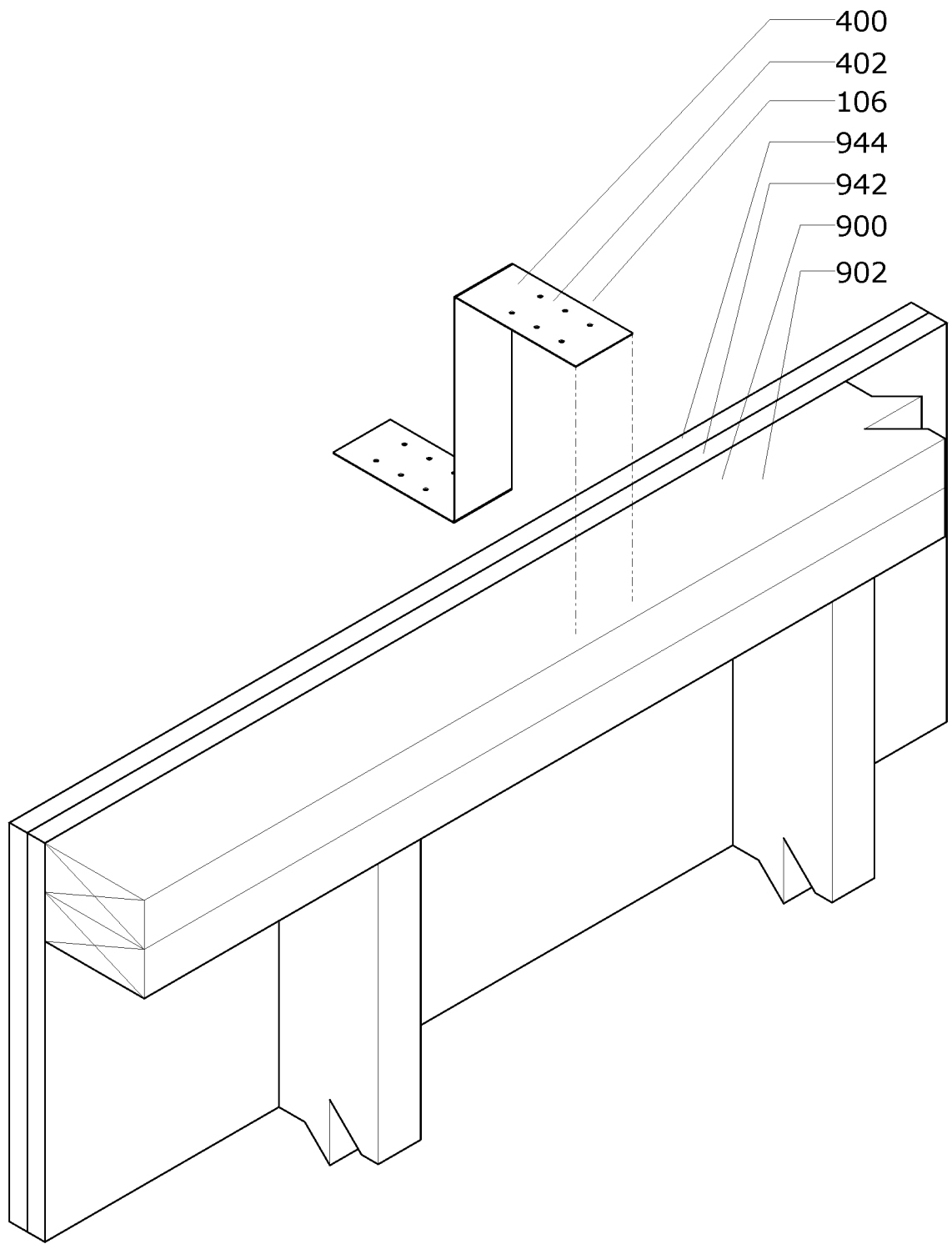

FIG. 26 shows the placement of the fourth embodiment on a stud wall

Figure 27:
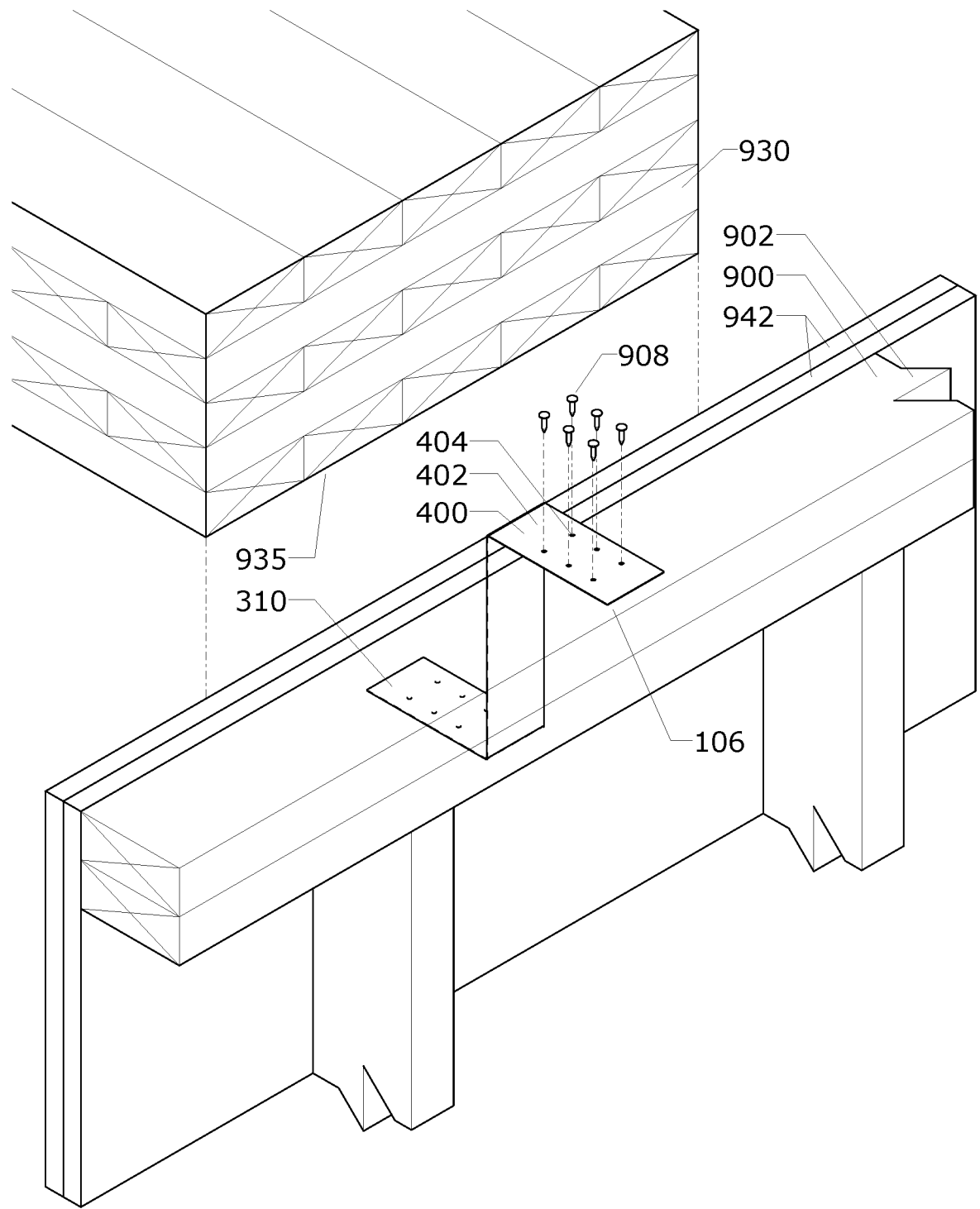

FIG. 27 shows the attachment of the fourth embodiment to the wall with fasteners and the placement of a mass timber panel on a panel seat of the fourth embodiment.

Figure 28:
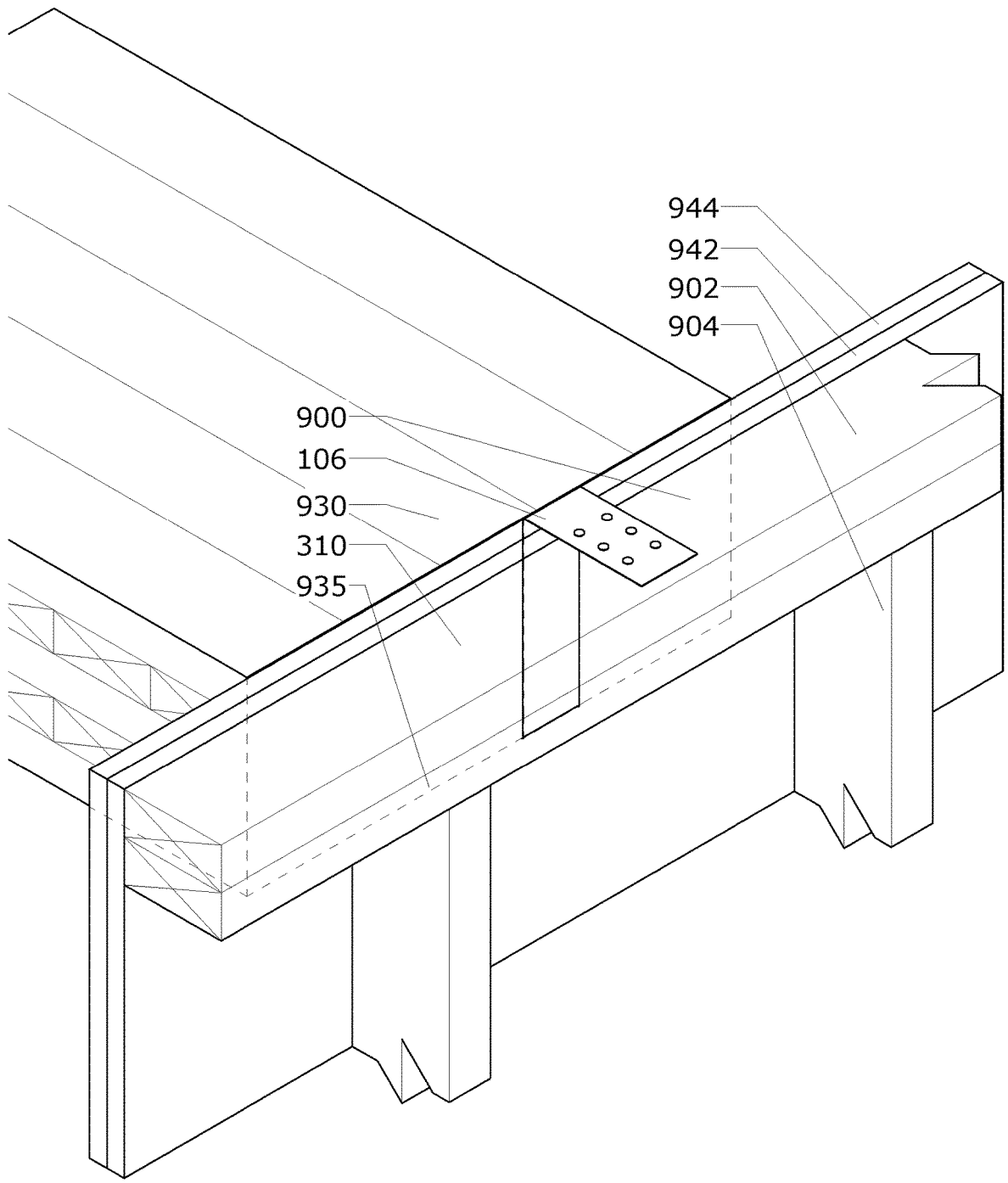

FIG. 28 shows the fourth embodiment attached to the wall and a mass timber panel placed on the fourth embodiment.

Figure 29:
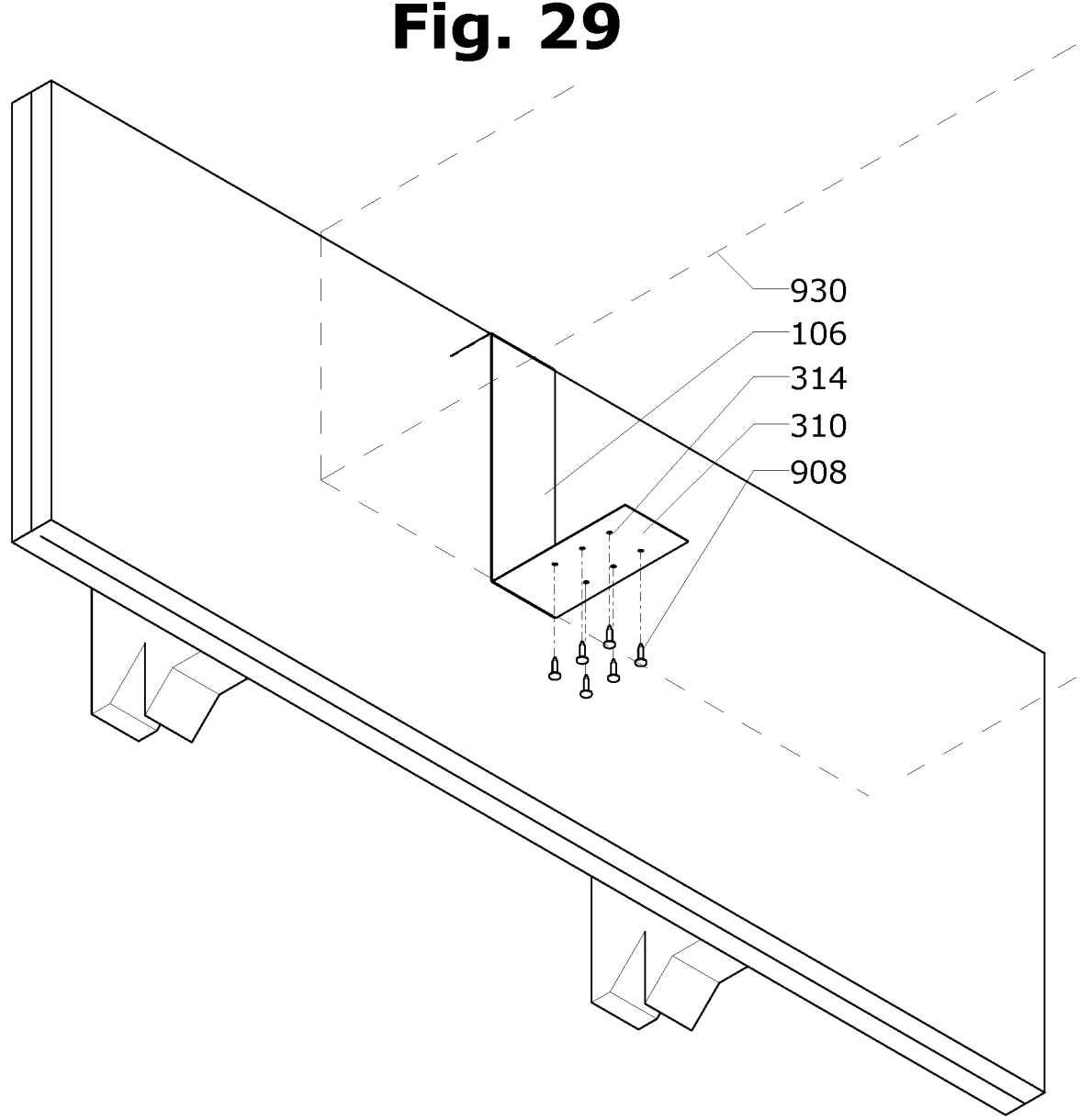

FIG. 29 shows the attachment of the mass timber panel to the fourth embodiment with fasteners.

Figure 30:
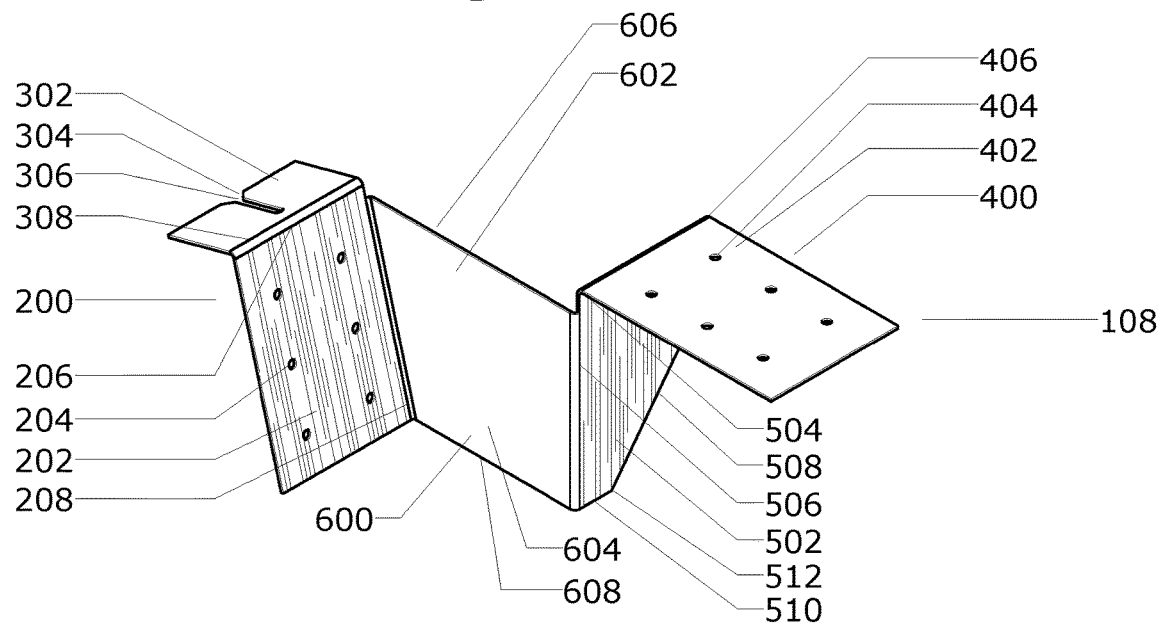

FIG. 30 shows a fifth embodiment of a device in a top front left axonometric view.

Figure 31:
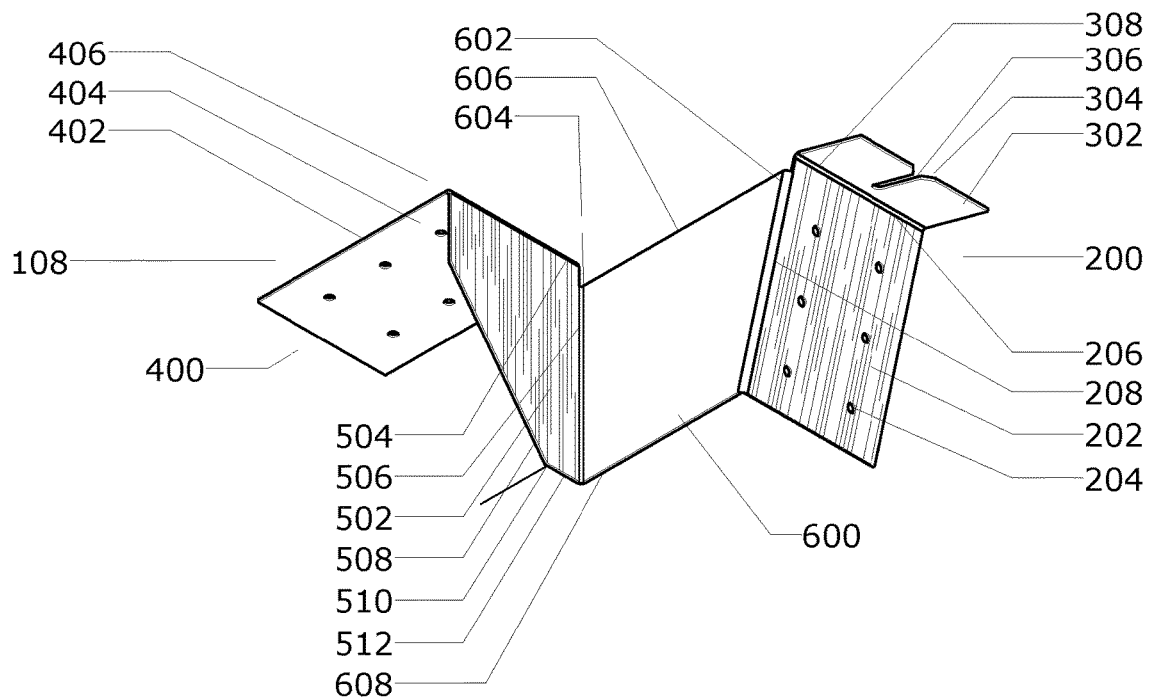

FIG. 31 shows the fifth embodiment of the device in a bottom back right axonometric view.

Figure 32:
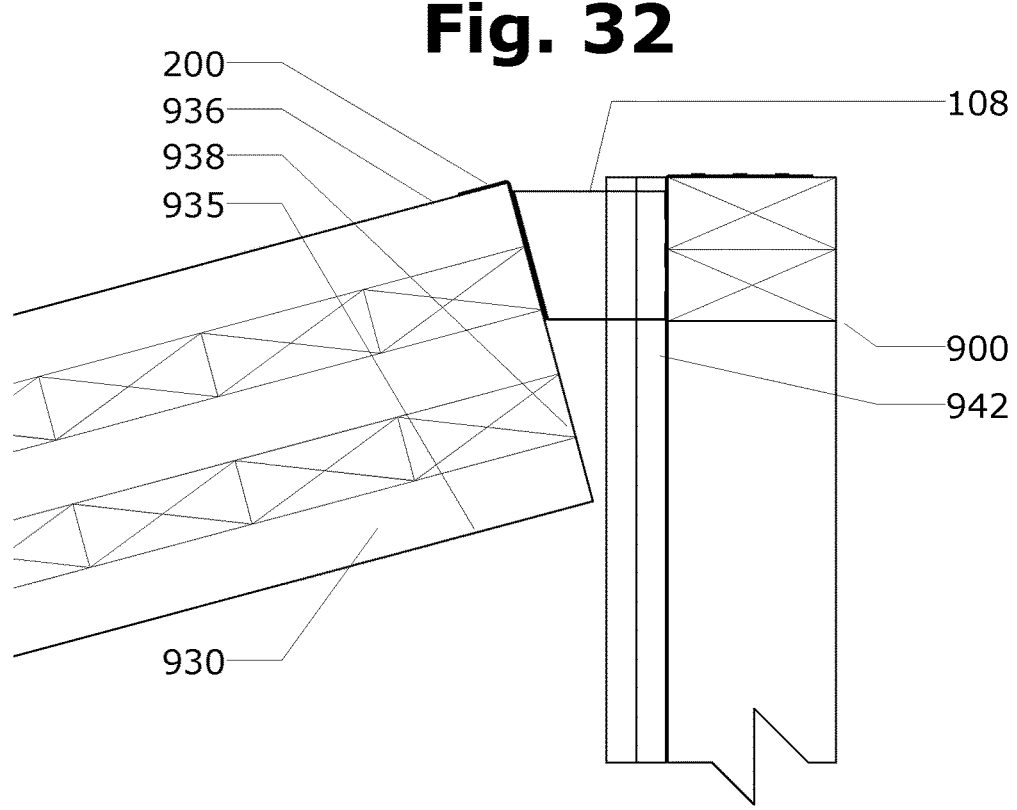

FIG. 32 shows a mass timber panel attached to the fifth embodiment attached to a stud wall with gypsum wallboard interposed between the mass timber panel and the stud wall in a left elevation view.

Figure 33:
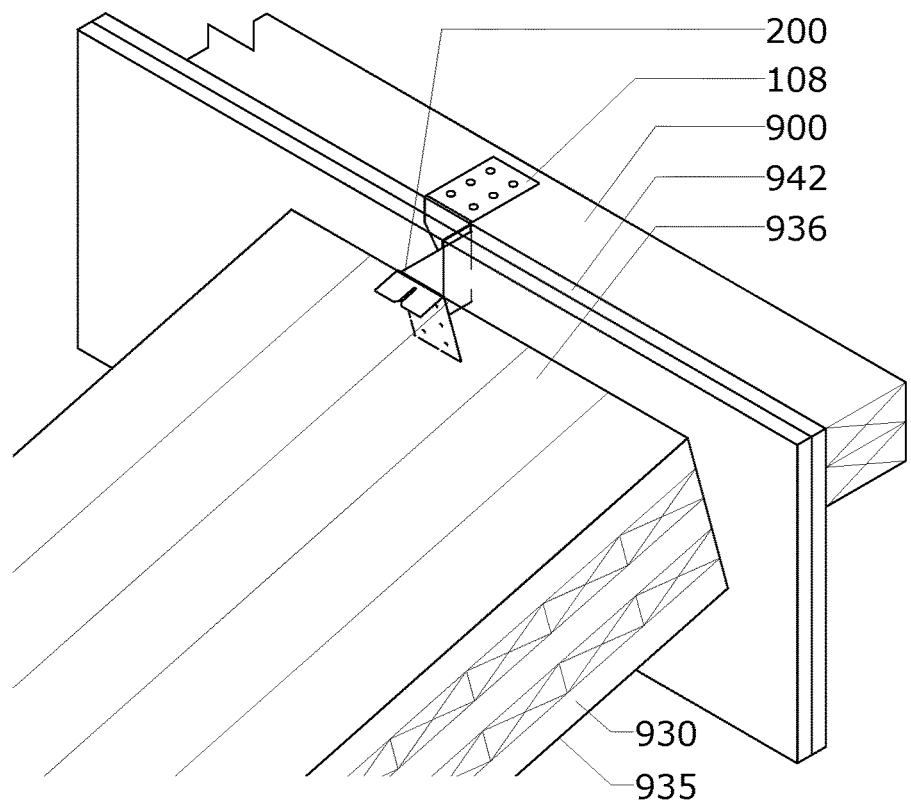

FIG. 33 shows a mass timber panel attached to the fifth embodiment attached to a stud wall with gypsum wallboard interposed between the mass timber panel and the stud wall in a top back left axonometric view.

Figure 34:
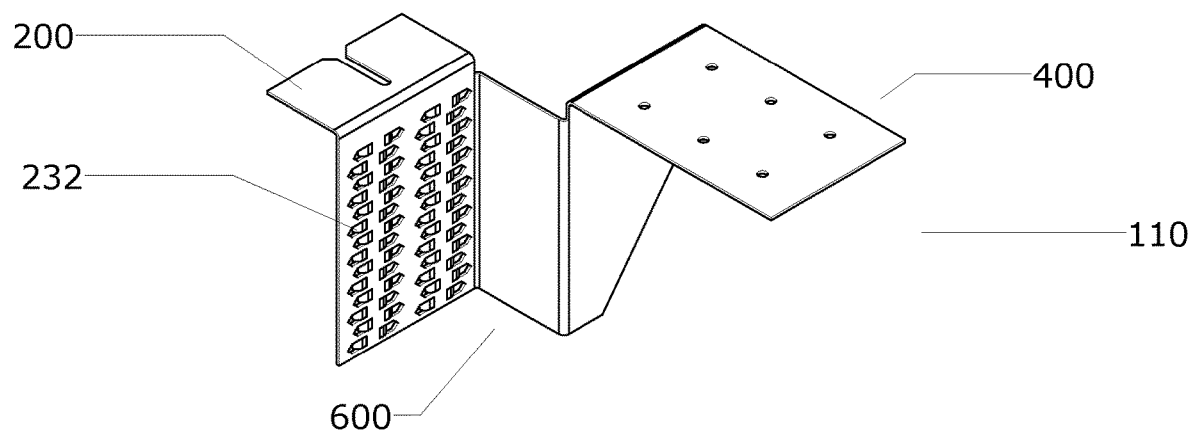

FIG. 34 shows a sixth embodiment of a device in a top front left axonometric view.

Figure 35:
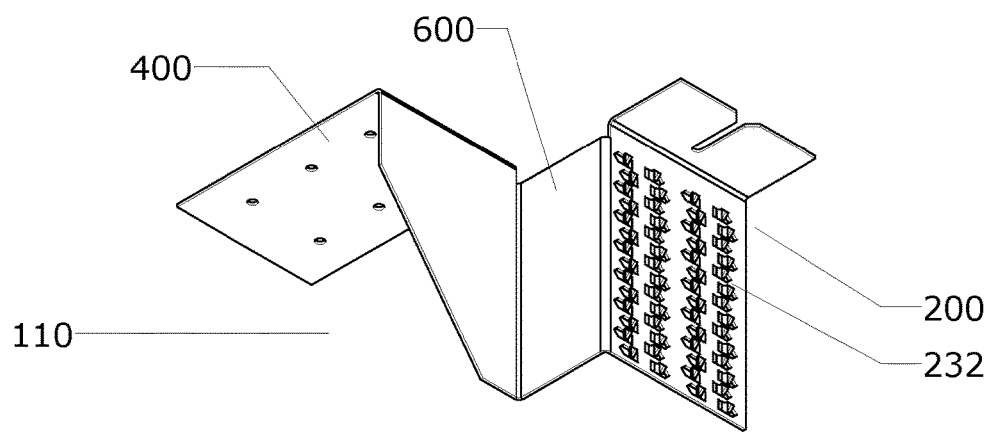

FIG. 35 shows the sixth embodiment of the device in a bottom back right axonometric view.

Figure 36:
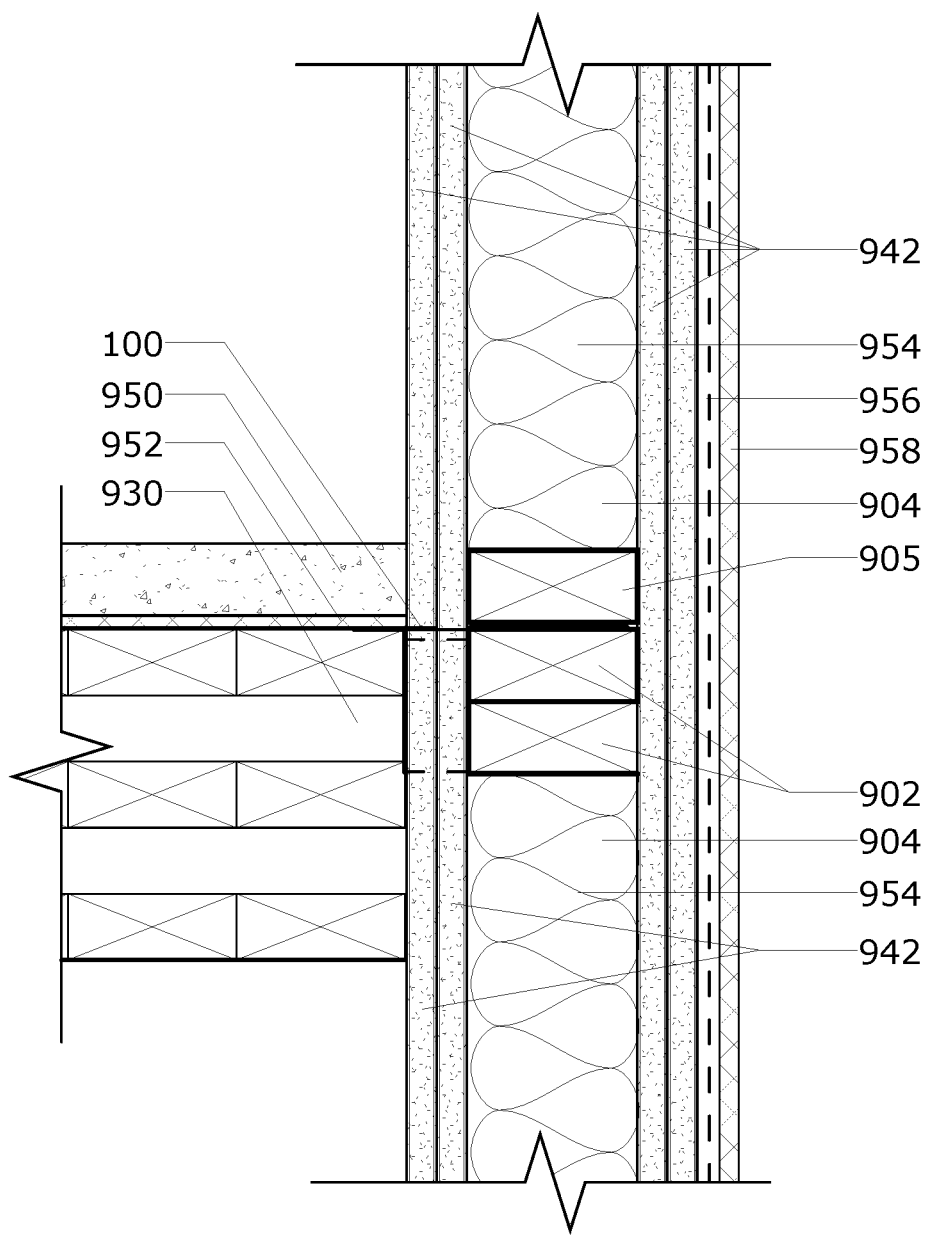

FIG. 36 shows one possible assembly of the mass timber hanger, the mass timber panel, an exterior stud wall below the mass timber panel, and another exterior stud wall above the mass timber panel, with gypsum wallboard interposed between the mass timber panel and the stud wall, in a section view.

Figure 37:
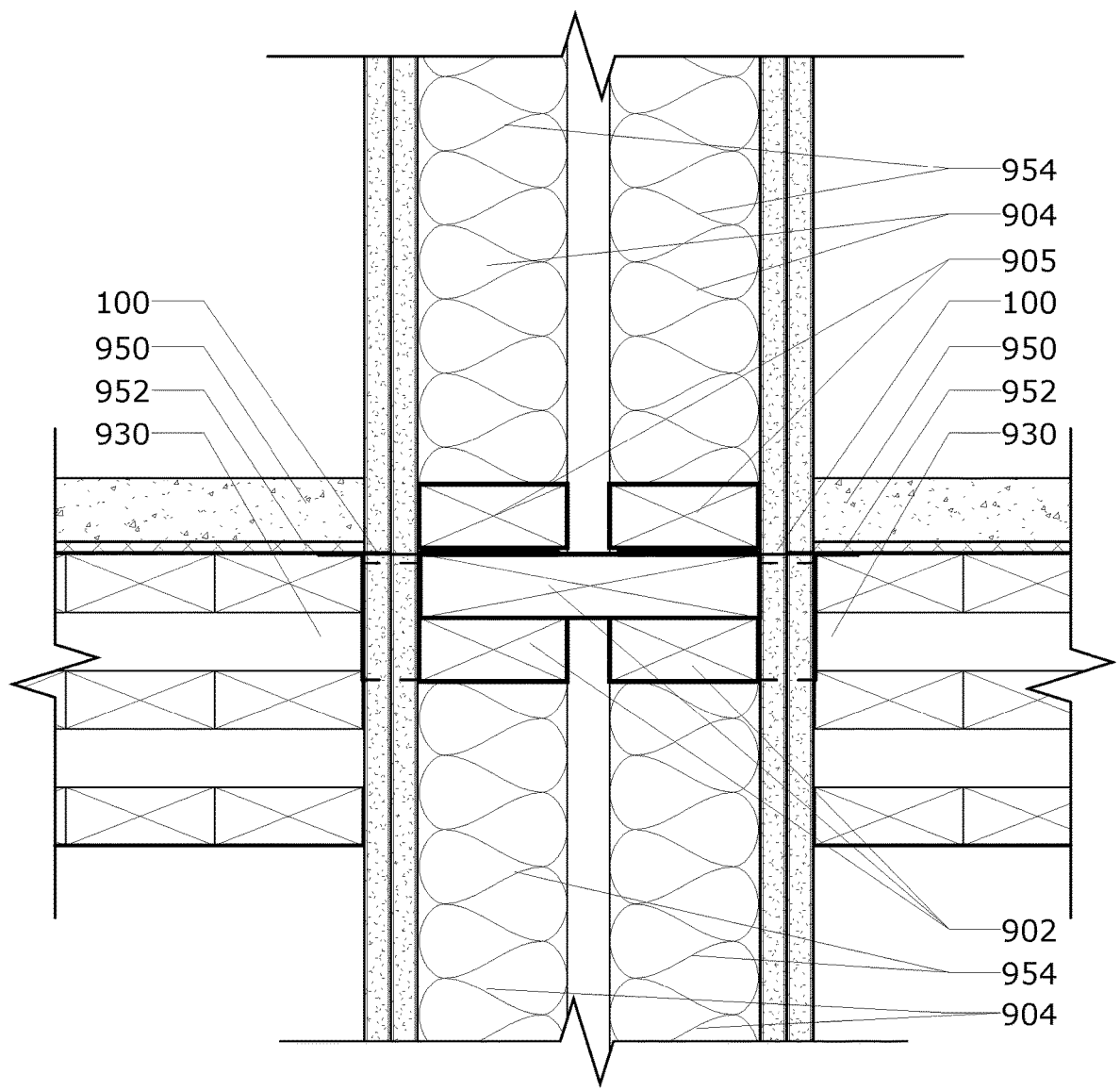

FIG. 37 shows one possible assembly of the mass timber hanger, the mass timber panel, an interior stud demising wall below the mass timber panel, and another interior stud demising wall above the mass timber panel, with gypsum wallboard interposed between the mass timber panel and the stud wall, in a section view.

Figure 38:
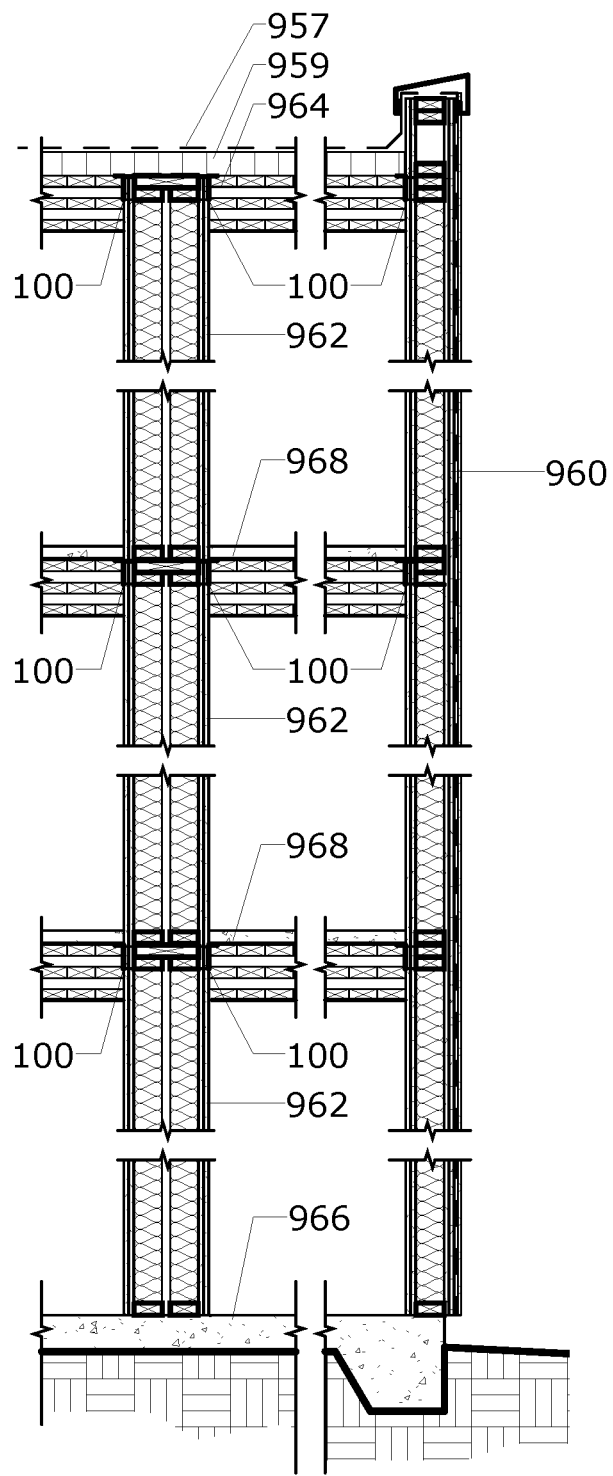

Similar to FIG. 36 & FIG. 37, FIG. 38 shows multiple levels of mass timber panel connected to both interior stud walls and exterior stud walls with mass timber hangers in a section view.

Figure 39:
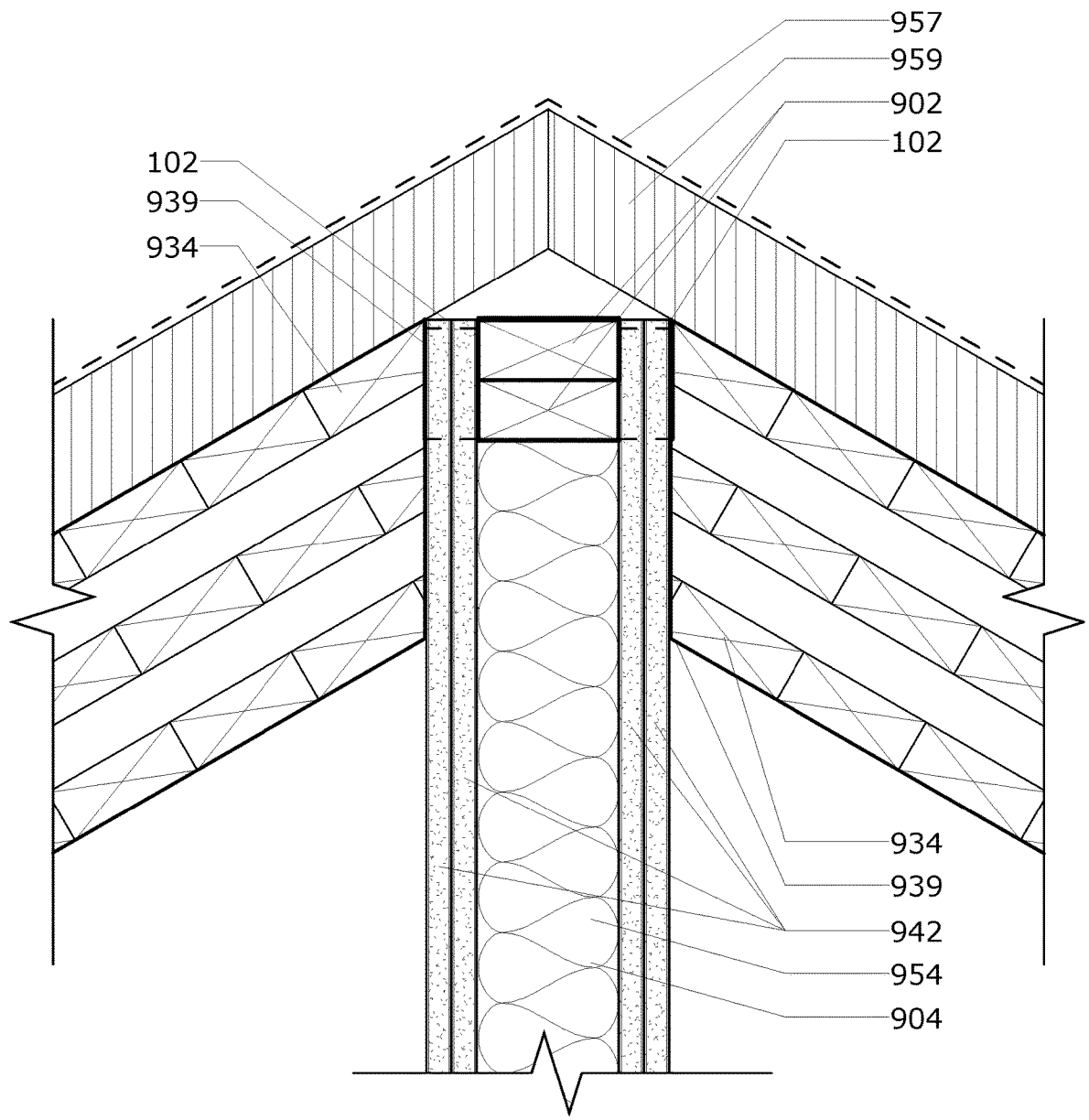

FIG. 39 shows a possible floor assembly and sloped roof assembly with a mass timber panel floor, stud wall, and mass timber panel roof, all connected with mass timber hangers, in a section view.

Figure 40:
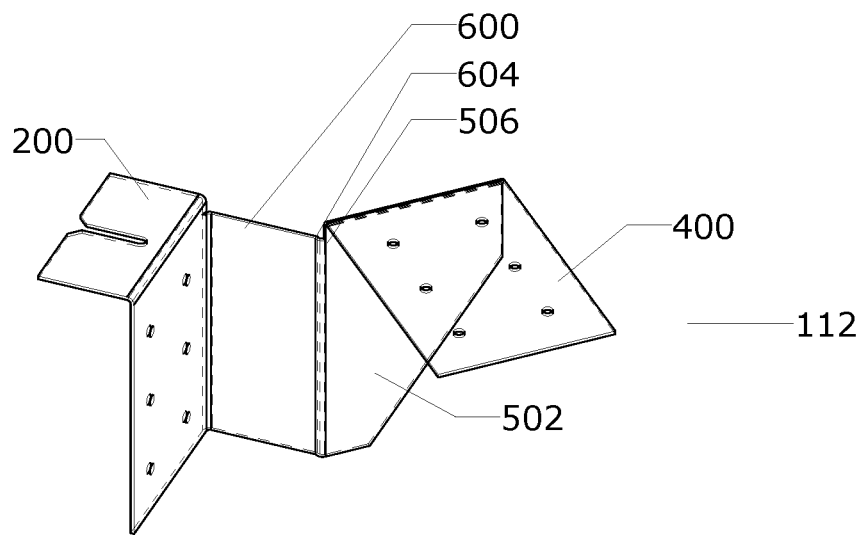

FIG. 40 shows a seventh embodiment of a mass timber hanger in a top front left axonometric view.

Figure 41:
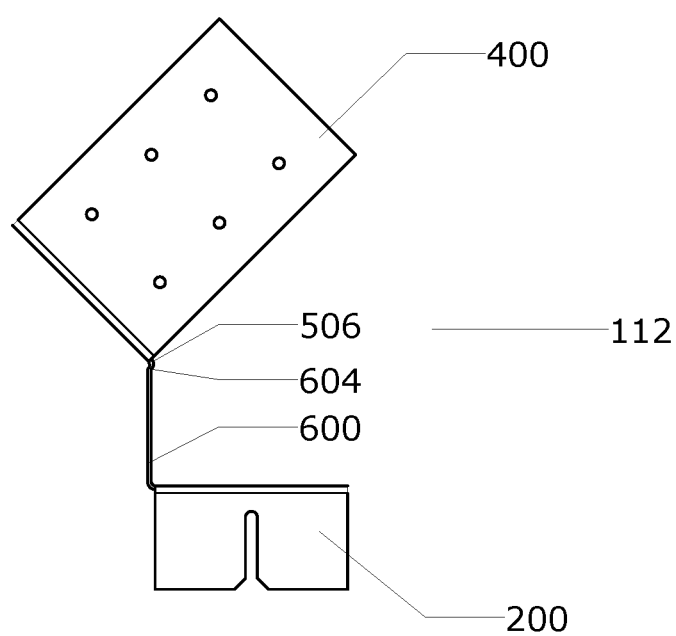

FIG. 41 shows the seventh embodiment of the mass timber hanger in a plan view.

DETAILED DESCRIPTION—FIGURES

Figure 1:
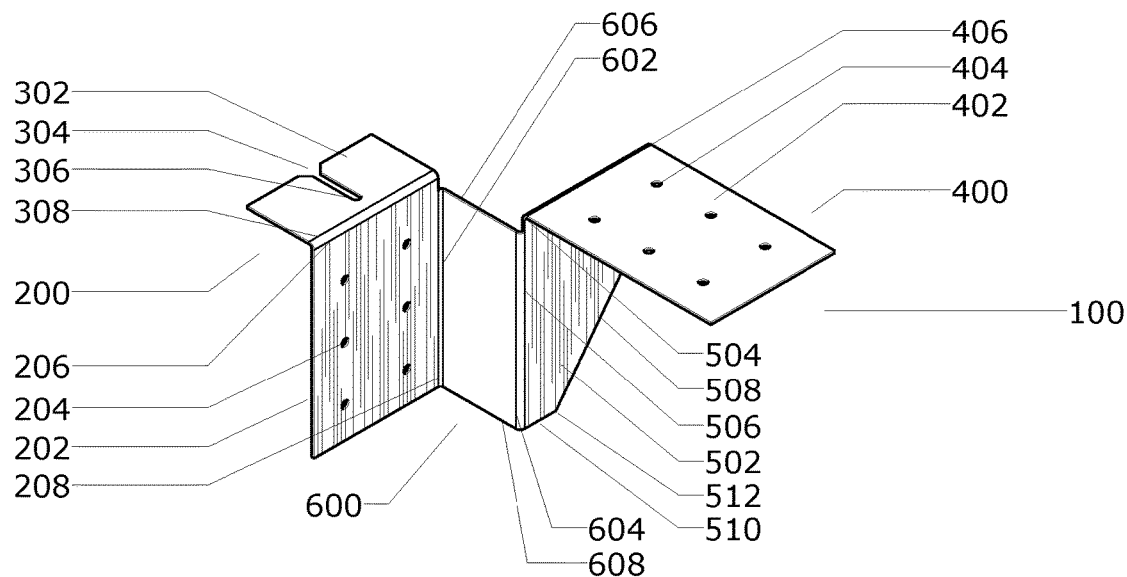
FIG. 1 shows a first embodiment of a device in a top front left axonometric view.
Figure 2:
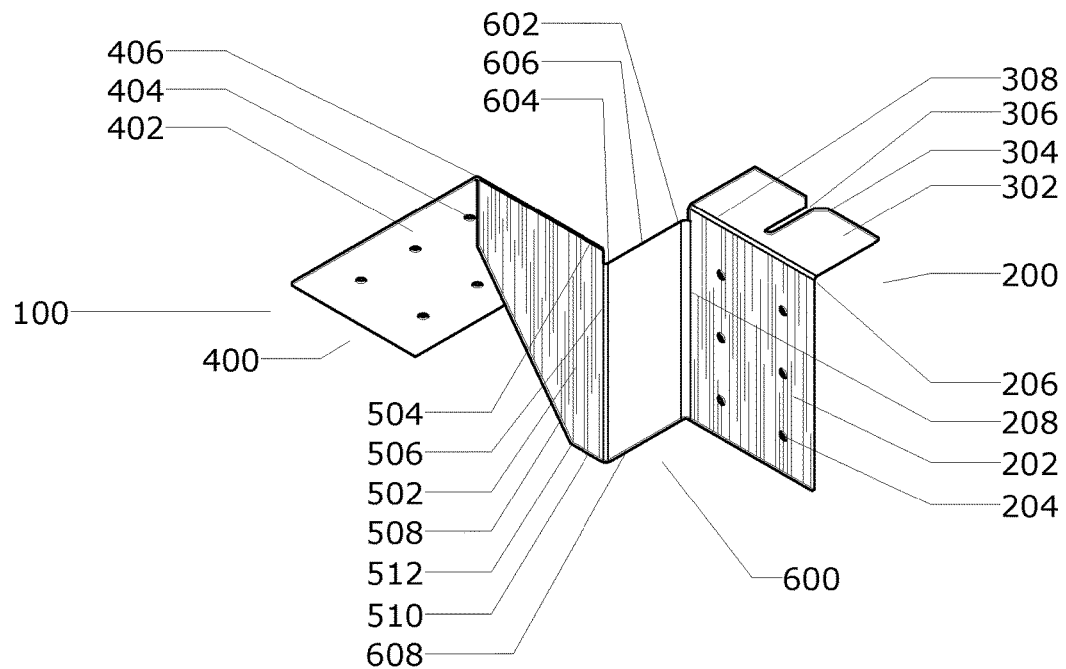
FIG. 2 shows the first embodiment of the device in a bottom back right axonometric view.

FIGS. 1 & 2 depict one embodiment of a mass timber hanger. This first embodiment of the 100 mass timber hanger comprises a plurality of legs: a 200 first leg comprising a 202 vertical portion and a 302 horizontal portion, a 400 second leg comprising a 402 horizontal portion and a 502 vertical portion, and a 600 third leg contiguous to the first and second legs. The 600 third leg connects to the 200 first leg and the 400 second leg edgewise by means of a ninety degree bend and holds the 200 first leg and 400 second leg apart at a predetermined distance.

The 202 first leg vertical portion includes a plurality of 204 fastener points providing a means for connection between the hanger and a mass timber panel, a 206 first connection edge contiguous to the 302 first leg horizontal portion, and a 208 second connection edge contiguous to the 600 third leg.

The 302 first leg horizontal portion includes an 304 alignment notch leading which tapers into an 306 alignment kerf and a 308 connection edge contiguous to the 202 first leg vertical portion. The 304 alignment notch and 306 alignment kerf provide useful indices to align the hanger with various indicium on other parts of construction.

The 402 second leg horizontal portion includes a plurality of 404 fastener points providing a means for connection between the hanger and a wall and a 406 connection edge contiguous to the 502 second leg vertical portion.

The 502 second leg horizontal portion includes a 504 first connection edge contiguous to the 402 second leg horizontal portion and a 506 second connection edge contiguous to the 600 third leg. A portion of the 502 second leg horizontal portion contains a 508 diagonal face cut which aids in the placement of the hanger on a wall by reducing the width of the 502 second leg horizontal portion down to a predetermined length at a 510 bottom edge. Said predetermined length can, according to one embodiment of the hanger, allow a mechanic to visually align the hanger with the face of a wall-based structural member by moving the hanger until a 512 pointing bottom corner reaches an index placed on the wall-based structural member.

The 600 third leg includes a 602 first connection edge contiguous to the 202 first leg vertical portion, a 604 second connection point contiguous to the 504 second leg vertical portion. Furthermore, the 600 third leg includes a 606 top edge and a 608 bottom edge. In accordance with the first embodiment of the mass timber hanger, the length of the 606 top edge and the 608 bottom edge are equal. The length of the 606 top edge and 608 bottom edge also determines the distance between the 200 first leg and the 400 second leg and provides a fixed dimension for the application of a sheathing layer interposed between the wall and the hanger.

FIG. 3-8 show, as a series, first the attachment of the 100 first embodiment to a 930 mass timber panel, then the attachment of the 930 mass timber panel to a 900 stud wall by means of the 100 mass timber hanger.

FIG. 3—The manufacturing of mass timber panels, including their cutting to final dimensions, often occurs away from the construction site. An embodiment of the 100 mass timber hanger could be placed on the 930 mass timber panel at the same time as its manufacture, prior to the panel placement in a building. Off-site placement (i.e. not in-situ)

of the 100 mass timber hanger allows a manufacturer to apply the 100 hanger without adding additional steps to the manufacturing and supply of the mass timber panel. Additionally, registering the 100 mass timber hanger to the top of the 930 mass timber panel allows for the thickness of the 930 mass timber panel to increase or decrease. The mass timber panel shown in FIG. 3-8 is a 934 5-ply mass timber panel, but could be a 3-ply or 7-ply panel without interfering with the utility of the 100 hanger.

Supposing an index was placed on the 934 mass timber panel, a mechanic or a machine could identify the index and place the 100 mass timber hanger on the 934 mass timber panel accurately by aligning the 304 alignment notch and 306 alignment kerf.

FIG. 4—After the proper alignment of the 100 mass timber hanger occurs along a 937 top edge of the 930 mass timber panel, the 204 first leg vertical portion fastener points provide voids for 908 fastener installation through the 202 first leg vertical portion into a 938 leading face of the mass timber panel. The 302 first leg horizontal portion provides simple purchase and alignment with the 937 mass timber panel top edge and a 936 mass timber panel top face.

Additionally, the location of the 908 generic fasteners relative to the structural force applied to them, that force generally being shear, puts them in the plane of their greatest mechanical strength. Fasteners, especially nails which lack the threading of screws or bolts, have exceptional shear strength compared to their pullout strength. Placing the 908 fasteners into panel's 938 leading face places the fasteners under a shear force, their strongest and most optimal location relative to the downward force of the 930 panel.

FIG. 5—The 930 mass timber panel and the 100 first embodiment mass timber hanger, now connected structurally by 908 fasteners, align to the 900 stud wall about a 902 stud wall double top plate. The 402 second leg horizontal portion provides means of support for the 930 mass timber panel and even allows minute adjustments of the 930 panel along an 903 edge of the 902 top plate without requiring permanent fastening.

FIG. 6—The 502 second leg vertical portion of the 100 first embodiment includes the 508 diagonal face cut which tapers the width of the 502 second leg down to the 512 pointing bottom corner. The 512 pointing bottom corner can be aligned to an 906 indicator mark on the bottom of the 902 top plate of the 900 stud wall. The 508 diagonal face cut also provides visibility of a potential indicator mark placed on the vertical face of the 902 top plate.

FIG. 7—Once final alignment of the 930 mass timber panel and 100 mass timber hanger has occurred relative to the 900 stud wall, the 404 second leg horizontal portion fastener points provide voids for 908 fastener installation through the 402 second leg vertical portion and into the 902 top plate. The 600 third leg provides an offset of a certain length between the 200 first leg and the 400 second leg. Similarly, the 600 third leg provides a separation between the 930 mass timber panel and the 900 stud wall.

FIG. 8—The gap between the 200 first leg and 400 second leg provided by the 600 third leg creates a space between the 900 stud wall and the 930 mass timber panel for 942 gypsum wallboard panels. A 944 top edge of the 942 gypsum wallboard panel includes a 946 kerf cut through which the 600 third leg can pass. While the order of installation of the 942 gypsum wallboard panels, meaning whether installation occurs before or after the attachment of the 930 mass timber panel and 100 mass timber hanger to the 900 stud wall, does not affect the utility of the final assembly, the installation of 942 gypsum wallboard panels after the placement of the 930 mass timber panel and 100 mass timber hanger may be advantageous to a builder's staging and building schedule. Some protective sheathings, like 942 gypsum wallboard, are moisture sensitive. Waiting to install the 942 gypsum wallboard allows a builder to enclose and dry-in a building before installing moisture sensitive materials.

Alternately, the 942 gypsum wallboard panels may be installed on the 900 stud wall prior to the placement of the mass timber panel. In that order of operations, the mass timber hanger, aided by the weight of the attached 930 mass timber panel, can be hammered into place. The 600 third leg pierces the 944 top edge of the 942 gypsum wallboard and cuts through until the 400 second leg finds purchase along the top of the 900 stud wall. Thus the structural load of the 930 mass timber panel transfers through the 100 mass timber hanger directly into the 900 stud wall without placing any structural load on the 942 gypsum wallboard panels, which have very low structural capacity.

FIGS. 9 & 10—The installed 100 mass timber hanger provides a means for protection of the 900 stud wall from the 930 mass timber panel by providing a gap for the installation of 942 gypsum wallboard panels. The continuity of the 942 gypsum wallboard panels interposed between the 900 stud wall and the 930 mass timber panel satisfies the continuity requirements of model building codes.

FIG. 11—The 600 third leg of the 100 mass timber hanger extends through the 942 gypsum wallboard panel by means of the 946 kerf cut into the 944 top edge of the gypsum wallboard panel.

FIGS. 12 & 13—In one embodiment of a mass timber hanger, a 318 first leg fixing hook and a 434 second leg fixing hook provide a machine or mechanic the ability to fix the 100 mass timber hanger to a mass timber panel or to a wall. Using force, the machine or the mechanic can bend and push the hook into the mass timber panel or the wall. The 318 first leg fixing hook and the 434 fixing hook keep the mass timber hanger in place until a more permanent means of attachment can be used.

FIGS. 14 & 15—In another embodiment, a second embodiment, a simplified 200 first leg of a 102 mass timber hanger comprises a 202 vertical portion with a plurality of 204 fastener points and at least one 208 connecting edge. The 200 first leg provides a means of connection between the 102 mass timber hanger and a structural panel member.

FIGS. 16 & 17—In order to form an angled surface such as a roof, a 930 mass timber panel has a 939 angled leading edge, moving the 930 mass timber panel into an angled plane. The 104 mass timber panel provides the attachment of the angled 930 mass timber panel to a 900 stud wall while still leaving space for 942 gypsum wallboard panels interposed between the 930 mass timber panel and the 900 stud wall.

FIGS. 18 & 19—Similar to FIG. 16 & FIG. 17, the 104 mass timber hanger is used to attach 930 mass timber panels with 939 angled leading edges to the 900 stud wall to create angled surfaces, such as in a roof assembly.

FIGS. 20 & 21—In another embodiment of a mass timber hanger, a third embodiment, a 104 mass timber hanger comprises a plurality of legs, including a 200 first leg and a 400 second leg. The 200 first leg includes a 202 vertical portion having a 224 front face, a 226 back face, a 228 bottom edge, a 230 connecting edge, and 204 fastener points. The 400 second leg includes a 402 horizontal portion having a 424 top face, a 428 leading edge, a 430 connecting edge, and 404 fastener points. An 432 alignment point extends from the 424 top face of the 400 second leg. The 200 first leg and 400 second legs attach at their connecting edges, the 230 first leg connecting edge and 430 connecting edge, respectively.

FIG. 22—In accordance with one embodiment of the 104 mass timber hanger, the 200 first leg is configured to align with a 938 leading face of a 930 mass timber panel. The 432 alignment point extending from the 402 second leg vertical portion engages with a 937 top edge of the 930 mass timber panel. Supposing a machine or mechanic placed an 940 index on a 936 top face of the 930 mass timber panel marking the proper location for the 104 mass timber hanger, the 432 alignment point provides a means to register the 104 mass timber hanger to that 940 index proper location.

FIG. 23—The configuration of the 400 second leg provides a means for connecting the 104 mass timber hanger to the top of a 900 wall. The length of the 402 second leg horizontal portion allows the hanger to attach to the 902 top of a wall and span over top of 942 gypsum wallboard panels.

FIGS. 24 & 25—In still another embodiment of a mass timber hanger, a fourth embodiment, a 106 mass timber hanger comprises a plurality of legs, including a 200 first leg and 400 second leg. The 200 first leg includes a 202 vertical portion, said 202 vertical portion including a 224 front face, 226 back face, 228 bottom edge, and 230 connecting edge, and a 310 horizontal seat, said 310 horizontal seat including a 312 connection edge, 314 fastener points, and a 316 top face. The 400 second leg includes a 402 horizontal portion, said 402 horizontal portion including 404 fastener points, a 424 top face, a 426 bottom face, a 428 leading edge, and a 430 connecting edge. The 430 connecting edge of the 402 horizontal portion of the 400 second leg connects to the 230 connecting edge of the 202 vertical portion of the 200 first leg. The 228 bottom edge of the 202 vertical portion of the 200 first leg connects to the 312 panel seat connection edge of the 310 horizontal panel seat of the 200 first leg.

FIG. 26—The 402 horizontal portion of the 400 second leg of the 106 mass timber hanger is configured to engage a 902 top plate of a 900 stud wall and span across a 944 top edge of a 942 gypsum wallboard panel.

FIG. 27—With the 106 mass timber hanger in place on the 902 top plate of the 900 stud wall, 908 generic fasteners driven through the 404 fastener points of the 402 horizontal portion of the 400 second leg fasten the 106 mass timber hanger to the 900 stud wall. Once in place and attached, placement of a 930 mass timber panel can occur. The 935 bottom edge of the 930 mass timber panel rests on the 310 first leg panel seat.

FIG. 28—The 310 first leg panel seat supports the 930 mass timber panel along its 935 bottom edge. The structural load from the 930 mass timber panel transfers into the 106 mass timber hanger which then transfers the structural load into the 900 stud wall. The transfer of force spans across the 944 top edge of the 942 gypsum wallboard panel. The 942 gypsum wallboard panel has a low capacity for supporting point load forces like the point load force imposed on the 900 stud wall by the 930 mass timber panel through the 106 mass timber hanger. In this configuration, the 942 gypsum wallboard panel adequately protects and separates the 900 stud wall, including the 902 top plate and the 904 vertical studs, from the 930 mass timber panel.

FIG. 29—Connection between the 106 mass timber hanger and the 930 mass timber panel occurs when 908 generic fasteners insert through the 314 panel seat fastener points and into the 930 mass timber panel.

FIGS. 30 & 31 depict another embodiment of a 108 mass timber hanger, a fifth embodiment, which is similar to the first embodiment of the mass timber hanger depicted in FIG. 1 and FIG. 2 and shares the similar components. Unlike the first embodiment, the length of the 606 top edge of the 600 third leg is longer than the length of the 608 bottom edge of the 600 third leg. This inequality of length results in an angular change between the 200 first leg and the 400 second leg.

FIGS. 32 & 33—A 930 mass timber panel with a 938 leading face perpendicular to its 935 bottom face and 936 top face attaches to the angled 200 first leg of the 108 mass timber hanger. The 108 mass timber hanger holds the 930 mass timber panel at an acute angle relative to a 900 stud wall, such as would occur in a roof assembly. The 108 mass timber hanger holds the 930 mass timber panel off the 900 stud wall at such a distance that 942 gypsum wallboard panels can be placed interposed between the 930 mass timber panel and the 900 stud wall.

FIGS. 34 & 35—In accordance with another embodiment of a 110 mass timber hanger, a sixth embodiment, a series of 232 gang nail hooks provide a means for attachment of a 200 first leg to a mass timber panel. Likewise, 232 gang nail hooks along a 400 second leg can be used to attach the 110 mass timber hanger to the top of a wall. Similar to the first embodiment, as shown in FIG. 1, a 600 third leg connects the first and second leg.

FIG. 36 shows one possible embodiment of the mass timber hanger in a building where a floor meets an exterior wall. The exterior wall has two layers of 942 gypsum wallboard mounted to the interior side and exterior side of the wall. Additionally, the wall is filled with a 954 batt insulation between 904 vertical studs. Mounted to the exterior side of the wall, a layer of a 956 weather resistant barrier exists between the 942 gypsum wallboard and 958 exterior siding. On the interior of the wall, a 100 mass timber hanger connects to the top of the wall, specifically to a 902 double top plate of the wall, and holds the 930 mass timber panel floor away from the wall at a predetermined distance. Into that predetermined distance, two layers of 942 gypsum wallboard interpose between the 930 mass timber panel and the 902 double top plate, the 904 vertical studs and a 905 bottom plate. The 905 bottom plate indicates the start of another exterior wall on top of the wall below. The 942 gypsum wallboard (i.e. the protection layer) clearly continues from one wall to another and is separate from the floor assembly, thus satisfying model building code requirements for fire resistance rated wall construction. The 930 mass timber, acting as a part of a floor assembly, and connected to the wall via the 100 mass timber hanger, also includes a 952 sound isolation mat and a 950 gypsum concrete topping. Floor assemblies often include 952 sound isolation mats and 950 gypsum concrete in residential and office buildings.

FIG. 37 shows another possible example of the mass timber hanger in a building, specifically at a demising wall location. Stud walls with two rows of 904 vertical studs increase the sound attenuating properties of a wall and also provide more space for building utilities. Demising walls similar to the wall show in FIG. 37 commonly exist in residential buildings, though they may also be found in commercial buildings separating spaces of differing uses. The demising wall assembly in FIG. 37 includes 954 batt insulation interposed between 904 vertical studs and two layers of 942 gypsum wallboard on both sides of the wall. Two 905 bottom plates, one at the bottom of each wall, sit on the 902 double top plate of the wall below. The 902 double top plate of the wall includes a larger top member spanning the air gap between the two rows of 904 vertical studs. The 100 mass timber panel hanger attaches to the 902 double top plate, below the 905 bottom plates of the wall above. The 100 mass timber hanger extends through the layers of 942 gypsum wall board and attaches to the 930 mass timber panel. A layer of an 952 acoustic sound isolation mat below a layer of 950 gypsum concrete sits on top of the 930 mass timber panel. The demising wall supports the floor assembly and still maintains its continuity to satisfy the model building code requirements for fire resistance rated wall construction.

FIG. 38 connects the wall and floor intersections shown in FIG. 36 and FIG. 37 together to show a full building assembly in section, including a 964 roof covered with a layer of 959 rigid insulation and a layer of 957 roofing membrane. A 960 exterior wall extends from the 966 foundation and is continuous past the multiple 968 floor assemblies until it terminates at a parapet. The 968 floor assemblies are supported by the 960 exterior wall with 100 mass timber hangers at each level extending through the protective sheathing layer of the exterior wall. The 968 floor assemblies continue horizontally until they meet the protective sheathing layer of the 962 demising wall. The 962 demising wall maintains its continuity from the 966 foundation all the way to the roof and supports the 968 floor assemblies with 100 mass timber hangers extending through their protective sheathing layers, i.e. their gypsum wallboard sheathing.

FIG. 39 shows a roof assembly composed of two 930 mass timber panels with 939 angled leading edges. The 930 mass timber panels support a layer of 959 rigid insulation below a layer of 957 roof membrane. The supporting wall, composed of two layers of 942 gypsum wallboard on both sides of a layer of 904 vertical studs and topped with a 902 double top plate, supports the 930 mass timber panel roof with a 102 mass timber hanger. The 102 mass timber hanger attaches to the 902 double top plate and extends through the 942 gypsum wallboard before attaching to the 930 mass timber panel.

FIG. 40 FIG. 41 show another embodiment of a mass timber hanger, a seventh embodiment. The 112 mass timber hanger comprises a plurality of legs, including a 200 first leg contiguous to a 400 second leg through a connection provided by a 600 third leg and has a similar construction to the first embodiment of the mass timber hanger described in FIG. 1. The 400 second leg, having a 502 vertical portion with a 506 connection edge, attaches to the 600 third leg at the 600 third leg's 604 connection edge at an oblique angle. As a result of this oblique angle the 200 first leg and the 400 second leg are substantially out of parallel with each other, allowing the 112 mass timber hanger to connect a mass timber panel to a non-parallel wall.

The drawings and specific descriptions of the drawings, as well as any specific or alternative embodiments discussed, are intended to be read in conjunction with the entirety of this disclosure. The mass timber panel connector may, however, be embodied in many different forms and should not be construed as being limited to the embodiments set forth herein; rather, these embodiments are provided by way of illustration only and so that this disclosure will be thorough, complete, and fully convey understanding to those skilled in the art.

Even while drawings of some embodiments convey the use of those embodiments with specific vertical wall assemblies, the makeup and materials of the wall assemblies should be seen in an illustrative way and interpreted in a non-limiting sense, as many other types of structural wall systems exist and may be used in conjunction with a mass timber hanger. Likewise, while cross-laminated timber was used within the drawings and specification to illustrate a mass timber panel, the use of the mass timber hanger is not limited to only cross-laminated timber, as it may support any sheet material and connect it to a wall. The different materials composing the wall assemblies and floor assemblies described in the specification and illustrated in the drawings are meant to highlight the usefulness of various embodiments and should not limit the device to only those assembly materials.

I claim:

1. A hanger for the attachment of a structural panel member to a wall, said wall comprising vertical structure and at least one layer of sheathing, said hanger comprising:
a first leg providing a means for connecting the hanger to the structural member;
a second leg providing a means for connecting the hanger to the wall, said second leg having a portion being generally parallel but not touching the first leg;
wherein the second leg includes a vertical portion configured to engage a vertical face of the wall and a horizontal portion configured to engage a top edge of the wall;
and a third leg contiguous to both the first and second legs, generally perpendicular to the first and second legs, said third leg providing a predetermined separation distance between the first and second legs;
wherein the predetermined separation distance between the first and second leg provided by the third leg is substantially equal to the thickness of the sheathing when mounted on the wall.

2. The hanger of claim 1 further comprising an additional horizontal portion of the first leg, contiguous to the vertical portion of the first leg, engaging a top edge and a top face of the structural member.

3. The hanger of claim 2 further comprising indices useful for the alignment of the hanger to various indicium inscribed upon the structural member.

4. The hanger of claim 1 wherein the means for connecting includes at least one void in each the first leg and the second leg, said void providing a gap for the insertion of a fastener selected from the group consisting of nails, screws, bolts, and other common building construction fasteners.

5. The hanger of claim 1 wherein the separation distance provided by third leg is equal to the width of two layers of a ⅝" sheathing, providing a separation distance between the first and second leg that allows for the installation of the sheathing between the first and second leg.

6. The hanger of claim 1 wherein the length of the top edge of the third leg is greater than the length of the bottom edge of the third leg, moving the angular plane of the first and second legs out or parallel to one another.

7. The hanger of claim 1 wherein the means for connection of the first leg to the structural member includes at least one hook punched from the body of the first leg extending into the structural member.

8. The hanger of claim 1 further comprising at least one metal hook punched out and bent away from the body of the hanger which can be used by a machine or a mechanic to fix the hanger in place, whereby any undesired shifting of the hanger during the final attachment of the hanger to the structural member or wall is prevented.

9. The hanger of claim 1 wherein the angle of connection between the third leg and the second leg increases to an oblique angle, whereby the first leg and second leg are substantially out of parallel with each other.

\* \* \* \* \*